US006560638B1

United States Patent
Haneda et al.

(10) Patent No.: US 6,560,638 B1
(45) Date of Patent: May 6, 2003

(54) METHOD OF COMPOSING ELECTRONIC MAIL IN WHICH MAIL EXPRESSIONS CORRESPONDING TO A CATEGORY ATTRIBUTE OF AN ELECTRONIC MAIL ID OF THE DESTINATION ARE INSERTED INTO THE OUTGOING ELECTRONIC MAIL

(75) Inventors: Isamu Haneda, Soraku-gun (JP); Toshitaka Kaneda, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/434,006

(22) Filed: Nov. 4, 1999

(30) Foreign Application Priority Data

Nov. 5, 1998 (JP) ............................. 10-314370

(51) Int. Cl.[7] .............................................. G06F 15/16
(52) U.S. Cl. ........................................ 709/206; 709/246
(58) Field of Search ................................. 709/202, 245, 709/246, 206

(56) References Cited

U.S. PATENT DOCUMENTS 5,555,346 A 9/1996 Gross et al.
5,818,447 A 10/1998 Wolf et al.

FOREIGN PATENT DOCUMENTS

JP 10-27141 1/1998

OTHER PUBLICATIONS

*Method For Automatically Generating A Footer of Header Depending on Associated Distribution Attributes,* Research Disclosure, K. Mason Publications, No. 346, (Feb. 1, 1993), p. 219 XP 000360690—ISSN: 0374–4353.
*Characteristics of a Distribution Based Upon the Recipients,* IBM Technical Disclosure Bulletin, US, IBM Corp., vol. 32, No. 9B, (Feb. 1, 1990) p. 291 XP00008253—ISSN: 0018–8689.
*Categorizing Incoming Mail,* IBM Technical Disclosure Bulletin, US, IBM Corp. NY, vol. 35, No. 3, (Aug. 1, 1992); pp. 228–230, XP000326247 ISSN: 0018–8689.
*Defining of Auto–Actions Into Separate Classes,* IBM Technical Disclosure Bulletin, US, IBM Corp., NY; vol. 35, No. 4A, (Sep. 1, 1992) pp. 103–104, OX000314695 ISSN: 0018–8689.
*Multiline Text Entry From A Combo Box,* Researcha Disclosure, K. Mason Publications, Hampshire, GB, No. 335, (Mar. 1, 1992) p. 184 XP000301068 ISSN: 0374–4353.
European Search Report for European Patent Application EP 99 30 8840 dated Jul. 9, 2001.

*Primary Examiner*—Le Hien Luu
*Assistant Examiner*—Stephan Willett
(74) *Attorney, Agent, or Firm*—David G. Conlin; John J. Penny; Edwards & Angell, LLP

(57) ABSTRACT

A method of composing an electronic mail so that an expression appropriate for a receiver of the electronic mail can be included in the contents of the outgoing electronic mail. The method includes the steps of setting an electronic mail ID of the of receiver in the outgoing electronic mail and inserting a mail expression corresponding to a category attribute of the electronic mail ID of the receiver into the body of the outgoing electronic mail.

16 Claims, 23 Drawing Sheets

| NAME | MAIL ID | PHONE NO. | CATEGORY |
|---|---|---|---|
| KOJI ISEKI | aaa@bbb.ccc | 1111-22-3333 | FRIEND |
| HARUKA KURIYAMA | bbb@bbb.ccc | 1111-22-4444 | TRADING PARTNER |
| : | : | : | : |
| : | : | : | : |
| MITUO TAZAKI | ccc@bbb.ccc | 1111-22-5555 | FAMILY |
| : | : | : | : |
| : | : | : | : |
| YUUJI YOKOYAMA | ddd@bbb.ccc | 1111-22-6666 | BOSS |

| NO. | CATEGORY |
|---|---|
| 1 | BOSS |
| 2 | COLLEAGUE |
| 3 | JUNIOR STUFF |
| 4 | TRADING PARTNER |
| 5 | FRIEND |
| 6 | FAMILY |

| NO. | PHRASES |
|---|---|
| 1 | I UNDERSTAND THE CONTENTS OF THE MAIL. |
| 1 | I AM GLAD TO UNDERSTAND THE CONTENTS OF YOUR MAIL. |
| 1 | I AM GLAD TO INFORM YOU OF MY REPLY TO THE CONTENTS OF YOUR MAIL AS FOLLOWS. |
| 1 | I AM GLAD TO REPLY TO YOUR QUESTION. |
| 2 | I UNDERSTAND. |
| 2 | ALL RIGHT. |
| 2 | OK. |
| 2 | I WILL REPLY AFTER CONSIDERATION. |
| 2 | I REPLY AS FOLLOWS. |
| 3 | I UNDERSTAND. |
| 3 | I HAVE DULY UNDERSTOOD. |
| 3 | PLEASE GIVE A REPORT ON ... . |
| 3 | PLEASE GIVE A SUPPLEMENTARY EXPLANATION REGARDING... . |
| 4 | IT IS MOST GRATIFYING THAT YOUR COMPANY IS PROSPERING. |
| 4 | WE APPRECIATE YOUR COOPERATION AND HELP ALL THE TIME. |
| 4 | WE ARE GLAD TO INFORM YOU OF OUR REPLY TO YOUR MAIL AS FOLLOWS. |
| 4 | WE ARE GLAD TO REPLY TO YOUR QUESTION AS FOLLOWS. |
| 5 | HELLO. |
| 5 | THANK YOU FOR YOUR MAIL. |
| 5 | IT HAS BEEN SOME TIME SINCE I LAST MADE CONTACT WITH YOU. |
| 5 | HOW ARE YOU? |
| 6 | I READ YOUR MAIL. |
| 6 | I UNDERSTAND. |

METHOD OF COMPOSING ELECTRONIC MAIL IN WHICH MAIL EXPRESSIONS CORRESPONDING TO A CATEGORY ATTRIBUTE OF AN ELECTRONIC MAIL ID OF THE DESTINATION ARE INSERTED INTO THE OUTGOING ELECTRONIC MAIL

BACKGROUND OF THE INVENTION

1. Field of the Invention

The present invention relates to a method of composing an electronic mail and a computer-readable recording medium recorded thereon an electronic mail composing program in order to have a computer execute the electronic mail composing method. In particular, the invention can be employed in an electronic mail system, and relates to a method of composing an electronic mail so as to enable a body of an outgoing electronic mail to be composed easily and to a computer-readable recording medium recorded thereon an electronic mail composing program in order to have a computer execute the electronic mail composing method.

2. Description of the Background Art

With development of network system, use of electronic mails has recently become increasingly prevalent that is realized by computer equipment (personal computer, work station, portable information terminal etc.). Japanese Patent Laying-Open No. 10-27141 discloses an electronic mail system which enables a return electronic mail to easily be composed for exchange of electronic mails which require reply.

According to this electronic mail system, a sender attaches a mark code and a response candidate list (list of response sentences), when the sender composes an outgoing electronic mail, to the body of the electronic mail at a portion to which any response is required. When the electronic mail is transmitted, control information associated with the mark code and the response candidate list is attached to the electronic mail.

The control information is formed of, in addition to information on the form such as destination address and subject, (1) information for specifying whether or not the mark code is displayed when the incoming electronic mail is displayed, (2) information for specifying whether or not the response candidate list is displayed when the incoming electronic mail is displayed, and (3) a standard response candidate list which is used when there is no response candidate list.

A receiver who receives the electronic mail to which the mark code and the response candidate list are attached together with the control information looks for the mark code in the incoming electronic mail and selects any response sentence from the response candidate list when the receiver composes a return electronic mail to the sender. The return electronic mail is thus composed automatically.

According to this electronic mail system, however, if a user who composes a return electronic mail does not know the method of answering a mail by utilizing the mark code, the user cannot know which portion in the electronic mail requires a response. Therefore, the user cannot select a response sentence from the response candidate list.

When the user composes a return electronic mail, the user selects a response sentence from the response candidate list which is prepared by the sender. In such a conventional electronic mail system, if the sender is the receiver's boss or trading partner, the receiver cannot change the expression of the response such that the response sentence is composed in polite expressions depending on the sender.

Further, if the receiver wants to return a response which is not included in the response candidate list prepared by the sender, the receiver after all has to compose the return electronic mail by the conventional method. In the conventional electronic mail system, the sender of a return electronic mail has a low degree of freedom and has difficulty in correctly conveying the sender's intention.

SUMMARY OF THE INVENTION

The present invention is made to solve the problems above. One object of the present invention is to provide a method of composing an electronic mail to allow expressions (words and phrases) which are appropriate for a receiver of the electronic mail to be employed as contents of the electronic mail, and a computer-readable recording medium on which recorded an electronic mail composing program in order to have a computer execute the method of composing an electronic mail.

Another object of the present invention is to provide a method of composing an electronic mail to enable a body of a return electronic mail which is appropriate for a receiver of the electronic mail to easily be composed, and a computer-readable recording medium on which recorded an electronic mail composing program in order to have a computer execute the method of composing an electronic mail.

Still another object of the present invention is to provide a method of composing an electronic mail to enable a body of a return electronic mail which is appropriate for a receiver of the electronic mail to easily be composed and to enable contents of an incoming mail to be quoted, and a computer-readable recording medium on which recorded an electronic mail composing program in order to have a computer execute the method of composing an electronic mail.

A further object of the present invention is to provide a method of composing an electronic mail to enable a body of a return electronic mail with various types of contents to easily be composed, and a computer-readable recording medium on which recorded an electronic mail composing program in order to have a computer execute the method of composing an electronic mail.

A still further object of the present invention is to provide a method of composing an electronic mail to enable mail expressions to be composed according to each category attribute by selecting a category attribute of each electronic mail ID (Identification), (mail address), and a computer-readable recording medium on which recorded an electronic mail composing program in order to have a computer execute the method of composing an electronic mail.

According to one aspect of the invention, a method of composing an electronic mail is employed in an electronic mail composing device including a memory which stores an electronic mail ID of a destination, a category attribute of the electronic mail ID, mail expressions which are grouped according to each category attribute, and an incoming electronic mail, an input/output unit which receives an operational instruction from a user, and a central control unit which composes an outgoing electronic mail following the operational instruction of the input/output unit. The electronic mail composing method above includes the steps of setting, by the central control unit, an electronic mail ID of a destination in an outgoing electronic mail following an operational instruction of the input/output unit, and inserting into a body of the outgoing electronic mail, by the central control unit, a mail expression corresponding to a category attribute of the electronic mail ID of the destination which is stored in the memory following an operational instruction of the input/output unit.

A mail expression which corresponds to a category attribute of an electronic mail ID of a destination is inserted into a body of an outgoing electronic mail. The body of the outgoing electronic mail which is appropriate for a receiver of the electronic mail can thus be composed easily by preliminary preparing a mail expression which corresponds to the category attribute.

Preferably, the step of setting the electronic mail ID of the destination includes the step of setting by the central control unit following an operational instruction of the input/output unit an electronic mail ID of a source of an incoming electronic mail which is stored in the memory in the outgoing electronic mail as the electronic mail ID of the destination. The step of inserting a mail expression into the body of the outgoing electronic mail includes the step of determining by the central control unit whether or not the electronic mail ID of the destination is registered in the memory, and if the electronic mail ID of the destination is registered in the memory, inserting a mail expression corresponding to the category attribute of the electronic mail ID of the destination into the body of the outgoing electronic mail.

A mail expression corresponding to a category attribute of an electronic mail ID of a destination of a return electronic mail is inserted into a body of the outgoing return electronic mail. The body of the return electronic mail appropriate for the receiver of the electronic mail can thus be composed easily.

Still preferably, the method of composing an electronic mail further includes the steps of allowing a user by the central control unit to select whether or not the user quotes contents of an incoming electronic mail, and quoting, by the central control unit, the contents of the incoming electronic mail stored in the memory in contents of an outgoing electronic mail if the central control unit receives an operational instruction from the input/output unit to quote the contents of the incoming electronic mail.

The contents of the incoming electronic mail can thus be quoted.

Still preferably, the method of composing an electronic mail includes the steps of allowing a user by the central control unit to select a category attribute of an electronic mail ID, allowing the user by the central control unit to compose a mail expression corresponding to the selected category attribute, and storing by the central control unit the mail expression composed by the user in the memory together with the category attribute.

The user can select a category attribute according to each electronic mail ID and compose a mail expression according to each category attribute.

Still preferably, the step of inserting a mail expression into a body of an outgoing electronic mail includes the steps of determining, by the central control unit, whether or not there is one type of mail expression or are a plurality of types of mail expressions corresponding to a category attribute stored in the memory, and inserting by the central control unit a mail expression into a body of an outgoing electronic mail if there is one type of mail expression corresponding to the category attribute, and if there are a plurality of types of mail expressions corresponding to the category attribute, allowing the user by the central control unit to select any one of the mail expressions, and inserting by the central control unit the mail expression selected by the user via the input/output unit that is stored in the memory into the body of the outgoing electronic mail.

Even if a plurality of types of mail expressions are prepared for a certain category attribute, one of the expressions is inserted into a body of an outgoing electronic mail. By preparing in advance a plurality of mail expressions for each category attribute, a body of an outgoing electronic mail having various types of contents can easily be composed.

According to another aspect of the invention, a computer-readable recording medium has recorded thereon an electronic mail composing program in order to have a computer execute a method of composing an electronic mail. A computer includes a memory which stores an electronic mail ID of a destination, a category attribute of the electronic mail ID, mail expressions grouped according to each category attribute, and an incoming electronic mail. The method of composing an electronic mail includes the steps of setting an electronic mail ID of a destination in an outgoing electronic mail and inserting into a body of the outgoing electronic mail a mail expression corresponding to a category attribute of the electronic mail ID of the destination which is stored in the memory.

A mail expression which corresponds to a category attribute of an electronic mail ID of a destination is inserted into a body of an outgoing electronic mail. By preliminary preparing the mail expression according to the category attribute, the body of the outgoing electronic mail which is appropriate for the receiver of the electronic mail can be composed easily.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates contents of an address book memory 11e;

FIG. 5A illustrates contents of a category memory 11g and FIG. 5B illustrates contents of a return mail expression memory 11f;

DESCRIPTION OF THE PREFERRED EMBODIMENTS

An electronic mail transmission and reception device in an embodiment of the present invention is hereinafter described in conjunction with the drawings.

Figure 1:
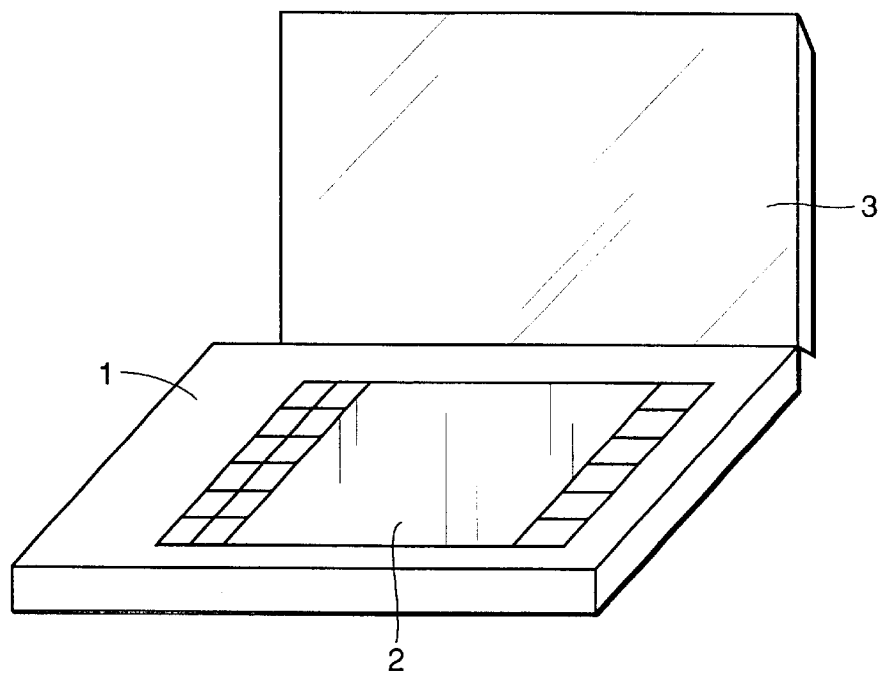
FIG. 1 is an external perspective view of an electronic mail transmission and reception device according to an embodiment of the present invention.

Referring to FIG. 1, the electronic mail transmission and reception device includes an input/output unit 2, a body part cabinet unit 1 having an infrared communication section, a pen holding section and the like (not shown), and a lid unit 3 which is hinged to the back of body part cabinet unit 1 and rotationally moves to cover input/output unit 2 so as to protect input/output unit 2 against dust or the like when the electronic mail transmission and reception device is carried.

Figure 2:
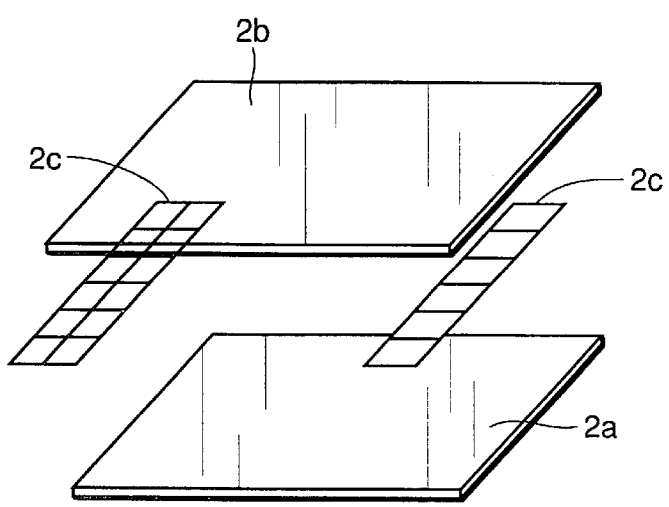
FIG. 2 is an exploded perspective view illustrating a structure of an input/output unit 2.

Referring to FIG. 2, input/output unit 2 includes a matrix crystal display unit 2a of thin type capable of displaying characters, a transparent tablet 2b formed of two transparent sheets having a size to cover liquid crystal display unit 2a, and a film 2c which is in parallel with one side of liquid crystal display unit 2a and placed under transparent tablet 2b on which fixed keys representing functions which are heavily used are printed.

According to need, backlight such as EL (Electro Luminescence) panel may be provided to the back of liquid crystal display 2a.

Transparent electrodes are regularly arranged respectively at opposing surfaces of the two transparent sheets of the transparent tablet. Further, small protruding spacers are regularly printed at each sheet so as to prevent the transparent electrodes from touching in a normal state. When a finger or pen touches the liquid crystal tablet unit, transparent electrodes located at the touched portion are brought into contact with each other, and information on this position is output. Accordingly, the position of the designated point is detected. Further, by correlating displayed contents on liquid crystal display unit 2a with the positional information of transparent tablet 2b, the position of liquid crystal display 2a selected by the user is detected.

Figure 3:
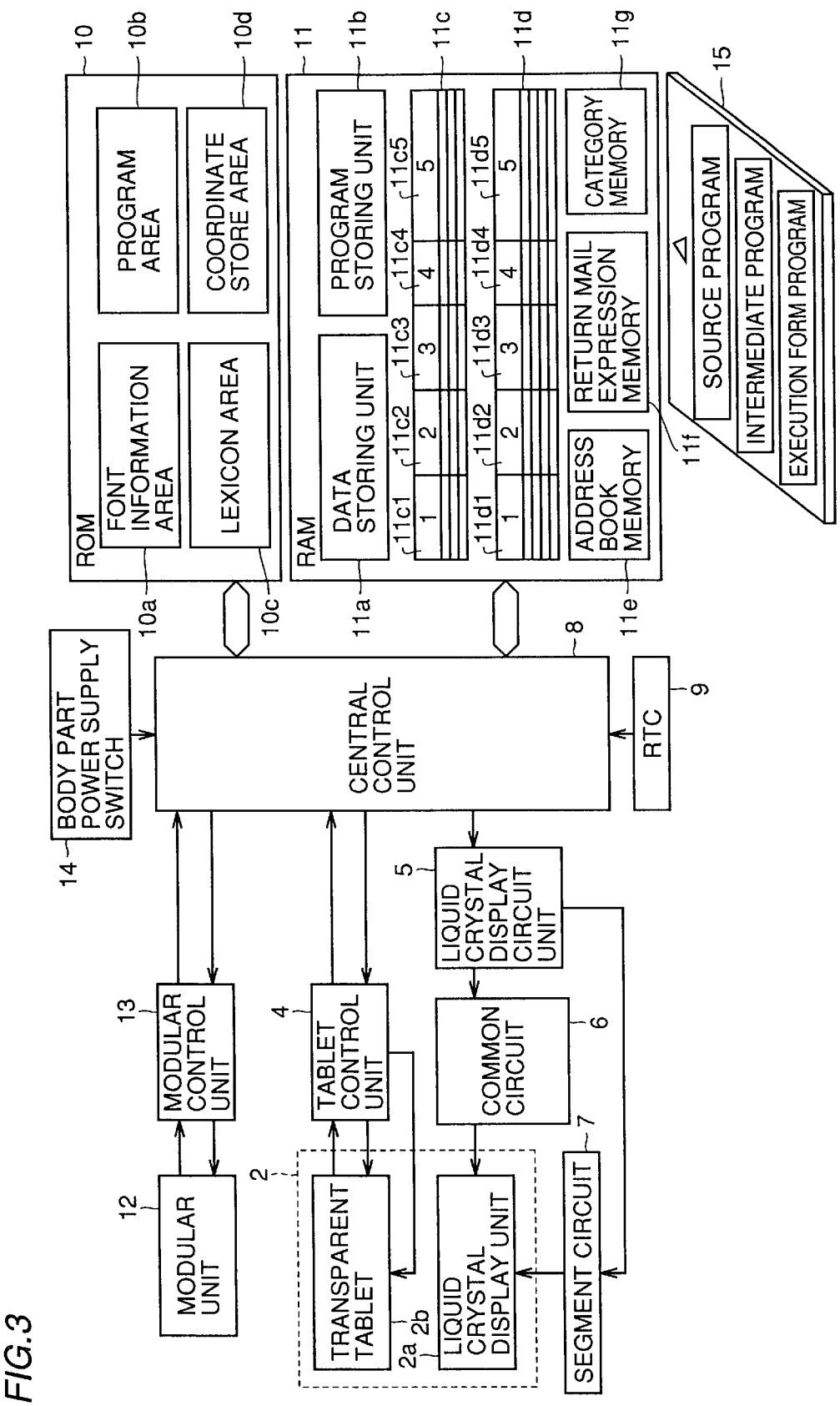
FIG. 3 is a block diagram illustrating a structure of the electronic mail transmission and reception device.

Referring to FIG. 3, the electronic mail transmission and reception device further includes a tablet control unit 4 connected to a plurality of transparent electrodes placed at the transparent sheets of transparent tablet 2b for obtaining information on a coordinate designated by a finger or pen, a common circuit 6 and a segment circuit 7 which are respectively connected to liquid crystal display 2a, a liquid crystal display circuit unit 5 which stores dot positions at which liquid crystal is lighted as a bit map and sends as required a signal to common circuit 6 or segment circuit 7 so as to display an image such as characters, a central control unit 8 for controlling each unit of the electronic mail transmission and reception device following various instructions, an RTC (Real Time Clock) 9 which counts time by a clock signal from an oscillating element (not shown) so as to output current date and time, an ROM (Read Only Memory) 10, an RAM (Random Access Memory) 11, a modular unit 12 connected to a communication line so as to transmit and receive an electronic mail and exchange data with the internet, a modular control unit 13 for controlling modular unit 12 following an instruction from central control unit 8, and a body part power supply switch 14 for turning on/off the power supply of the electronic mail transmission and reception device.

ROM 10 includes a font information area 10a in which fonts of characters to be displayed on liquid crystal display 2a are stored, a program area 10b in which a program which indicates a basic operation of central control unit 8 is stored, a lexicon area 10c in which lexicon for character translation is stored, and a coordinate store area 10d stored therein information on translation from a coordinate detected by tablet control unit 4 to a coordinate corresponding to the position of display.

RAM 11 includes a data storing unit 11a which stores various data input by a user from input/output unit 2 such as sentences and graphics, a program storing unit 11b which stores a program indicating an operation concerning transmission and reception of an electronic mail by central control unit 8, an incoming mail storing unit 11c which stores information on an incoming electronic mail, an outgoing (return) electronic mail storing unit 11d which stores information on an outgoing electronic mail, an address book memory 11e which stores information concerning a destination (receiver) such as an electronic mail ID of the destination, a return mail expression memory 11f which stores mail expressions corresponding to each category of a receiver, and a category memory 11g which stores a category name of a receiver.

The program stored in program storing unit 11b of RAM 11 is stored in a program medium 15 and installed in program storing unit 11b by using a program reading device (not shown). Program medium 15 is an information storage medium structured separably from the body part, such as CD-ROM (Compact Disc-Read Only Memory), floppy disk, IC (Integrated Circuit) card and the like. An execution form program as well as a source program and an intermediate program for building the execution form program are stored in program medium 15. Further, data necessary for operating the electronic mail transmission and reception device is stored in program medium 15. The data is stored in data storing unit 11a when the program above is installed.

An incoming electronic mail which is stored in incoming electronic mail storing unit 11c is formed of an incoming electronic mail subject 11c1, a source address 11c2, a destination address 11c3, receiving date and time 11c4, and incoming electronic mail contents 11c5.

An outgoing electronic mail which is stored in outgoing mail storing unit 11d is formed of an outgoing electronic mail subject 11d1, a source address 11d2, a destination address 11d3, transmitting date and time 11d4, and outgoing electronic mail contents 11d5.

Referring to FIG. 4, in address book memory 11e, the name of a receiver of an electronic mail, the receiver's electronic mail ID, the receiver's phone number, and a category which indicates the relation between the receiver and the user are stored.

Referring to FIG. 5A, in category memory 11g, the category above and a number associated with each category are stored.

Referring to FIG. 5B, in return mail expression memory 11f, expressions used for composing a return electronic mail are stored together with the number associated with the category to which the expressions belong to. For example, if the category is "boss," four expressions "I UNDERSTAND THE CONTENTS OF THE MAIL," "I AM GLAD TO UNDERSTAND THE CONTENTS OF YOUR MAIL," "I AM GLAD TO INFORM YOU OF MY REPLY TO THE CONTENTS OF YOUR MAIL AS FOLLOWS" and "I AM GLAD TO REPLY TO YOUR QUESTION" are stored. Any expression as above can be additionally registered following the method described below.

Figure 6:
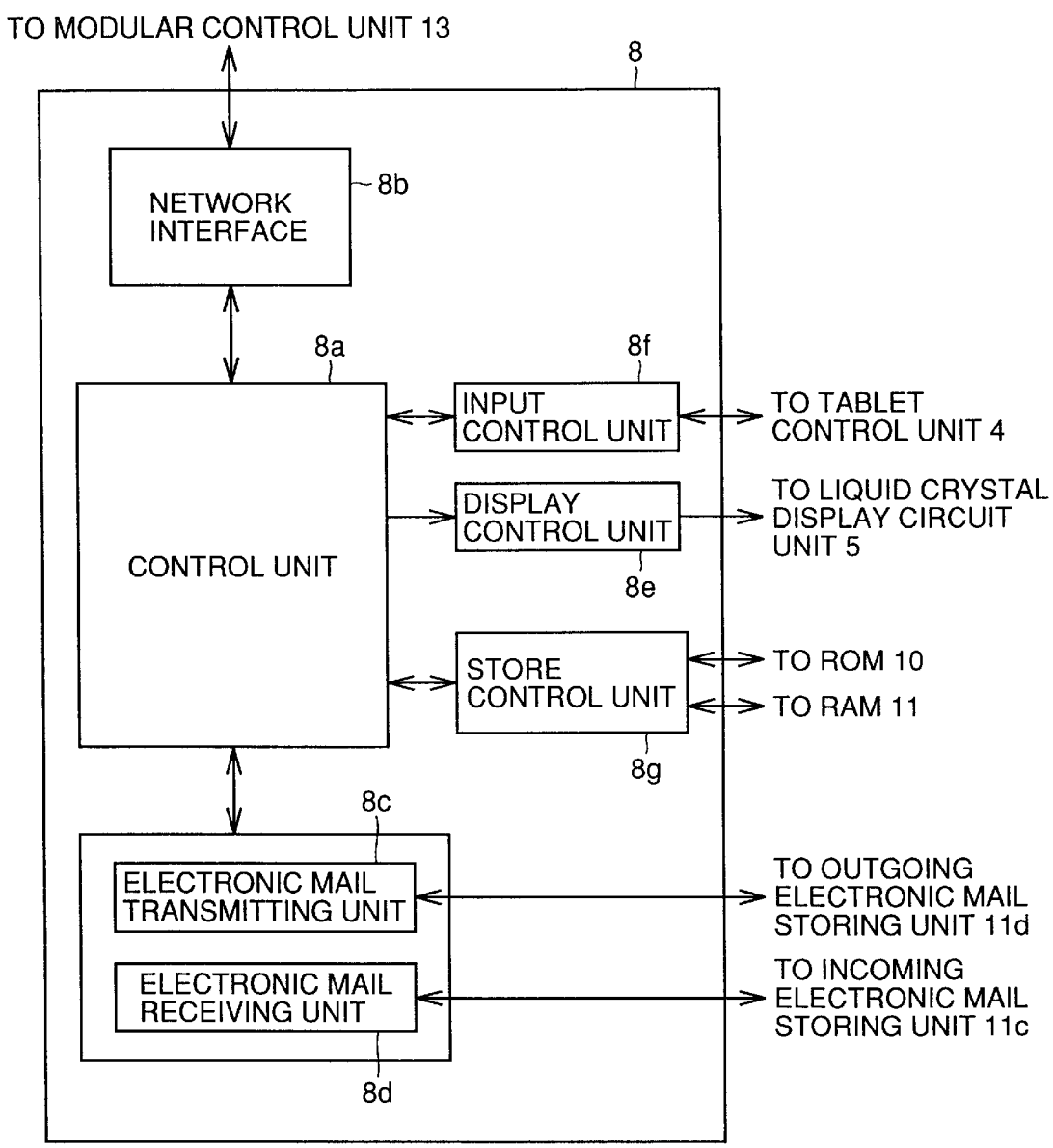
FIG. 6 is a block diagram illustrating a structure of a central control unit 8.

Referring to FIG. 6, central control unit 8 includes a network interface 8b connected to modular control unit 13 to transmit and receive an electronic mail and exchange data with the internet via modular control unit 13, an electronic mail transmitting unit 8c connected to outgoing electronic mail storing unit 11d to read information on an electronic mail to be transmitted from outgoing electronic mail storing unit 11d, an electronic mail receiving unit 8d connected to incoming electronic mail storing unit 11c to store information on a received electronic mail in incoming electronic mail storing unit 11c, an input control unit 8f connected to tablet control unit 4 to control tablet control unit 4 and receive coordinate information, a display control unit 8e connected to liquid crystal display circuit unit 5 to control liquid crystal display circuit unit 5, a store control unit 8g for managing input and output of ROM 10 and RAM 11, and a control unit 8a connected to network interface 8b, electronic mail transmitting unit 8c, electronic mail receiving unit 8d, input control unit 8f, display control unit 8e, and store control unit 8g to supply an electronic mail which is received via network interface 8b to electronic mail receiving unit 8d, supply an electronic mail received via electronic mail transmitting unit 8c to network interface 8b, transmit a control signal to each unit, transmit and receive data, and control each unit.

Referring to FIGS. 7 to 23, the electronic mail transmission and reception device operates in the following way.

Figure 7:
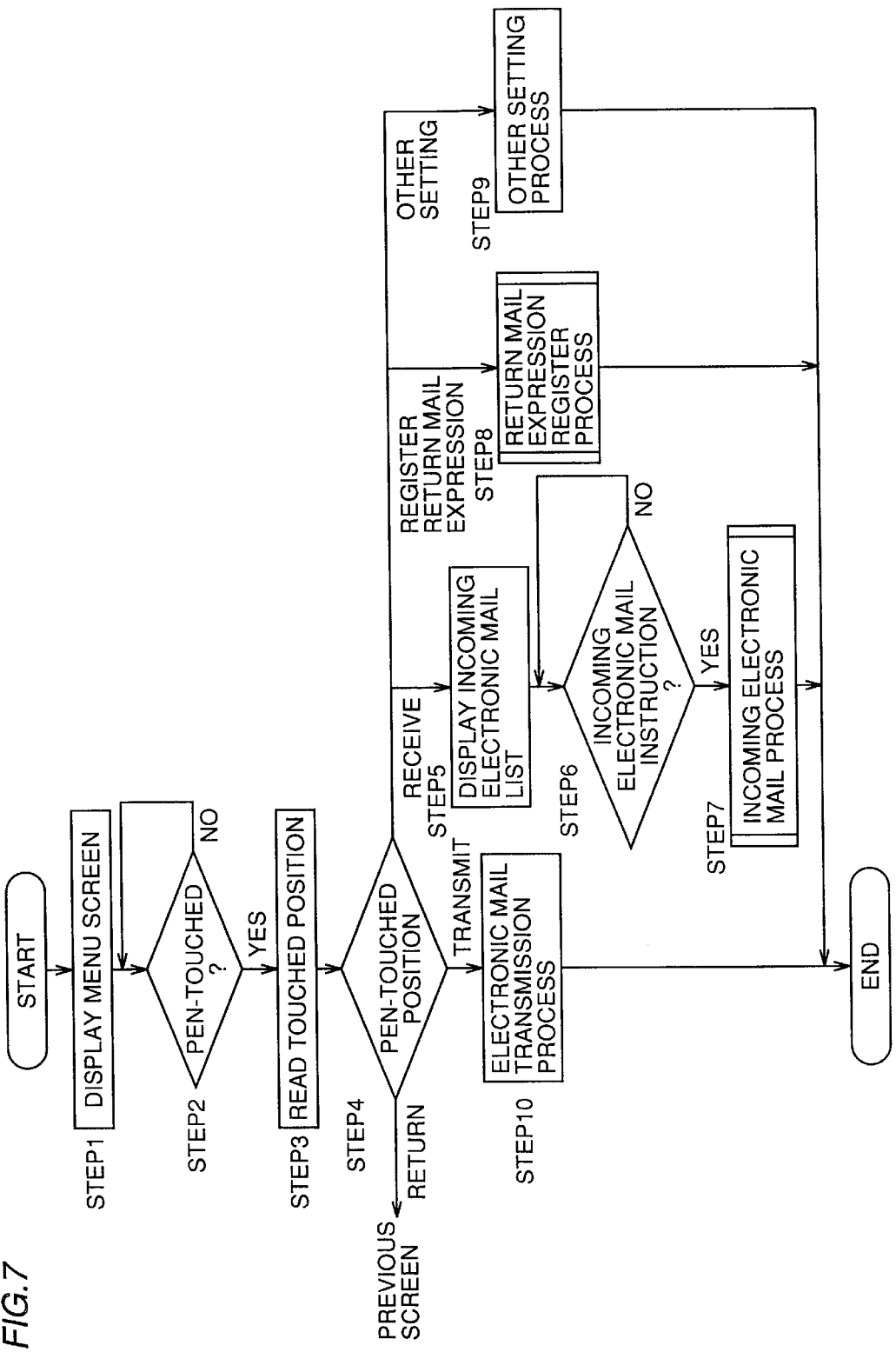
FIG. 7 is a flow chart illustrating an operation of the electronic mail transmission and reception device.
Figure 8:
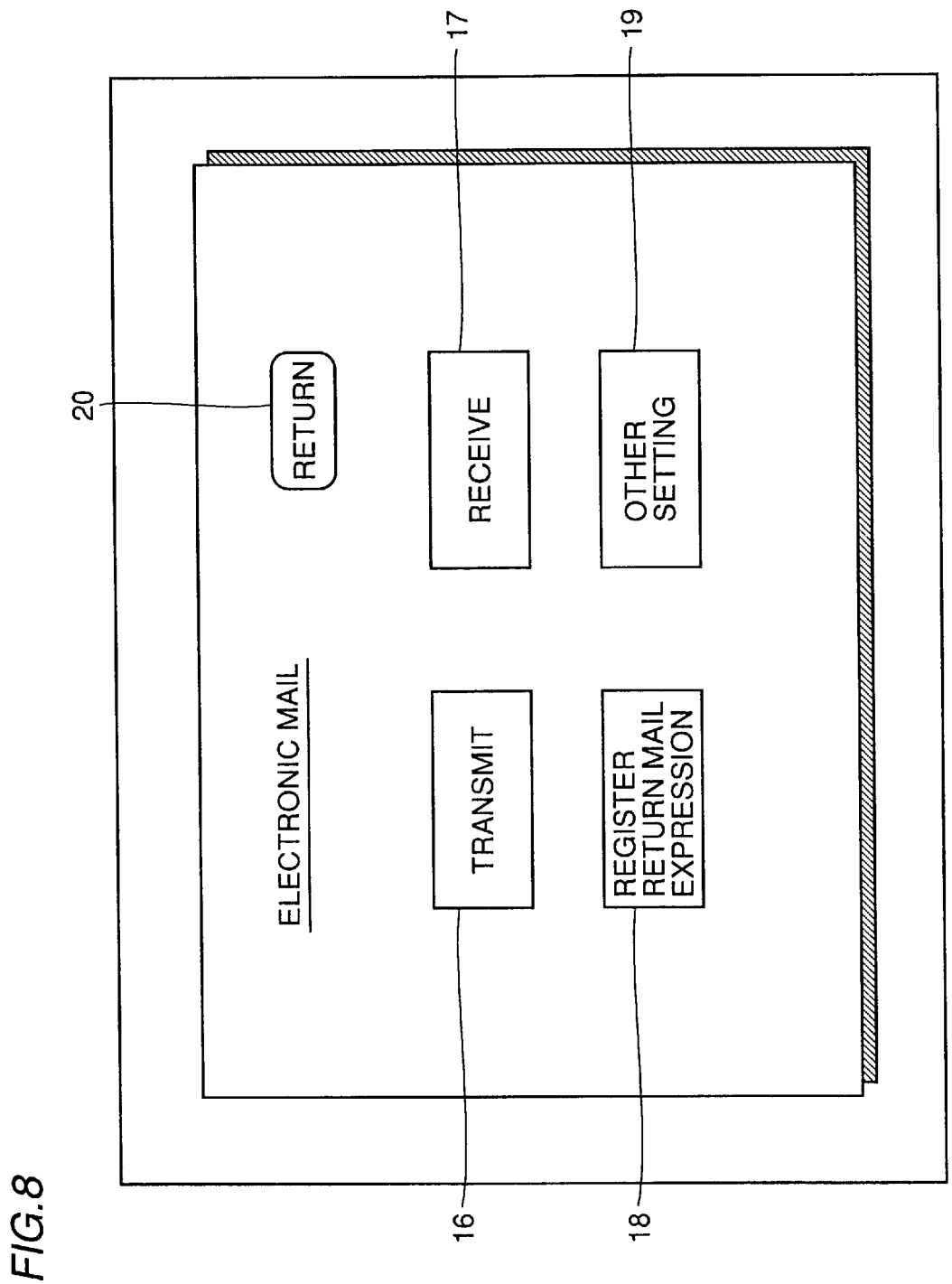
FIG. 8 illustrates a menu screen.
Figure 9A:
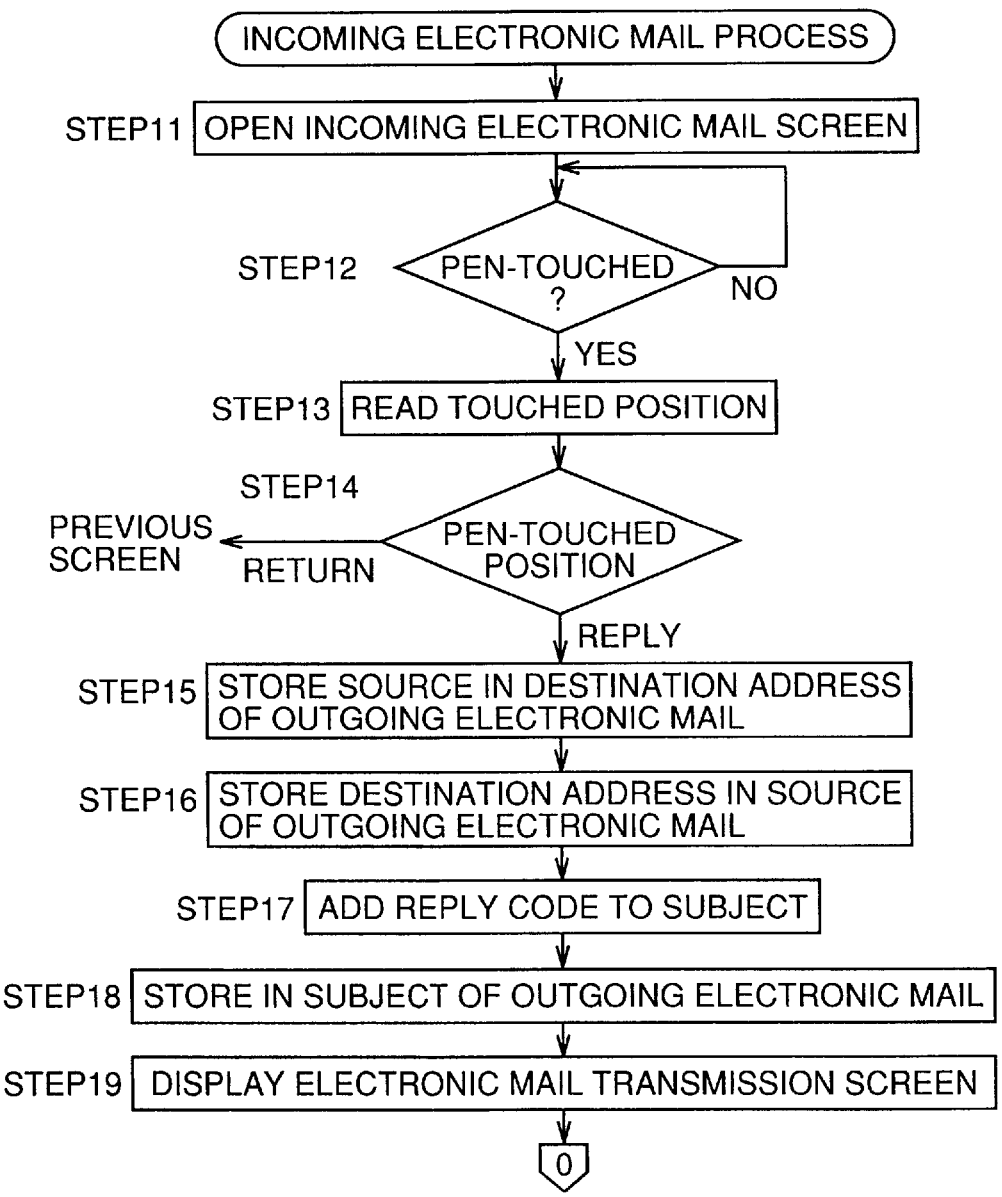
FIGS. 9A and 9B are flow charts illustrating a procedure of an incoming mail process.
Figure 9B:
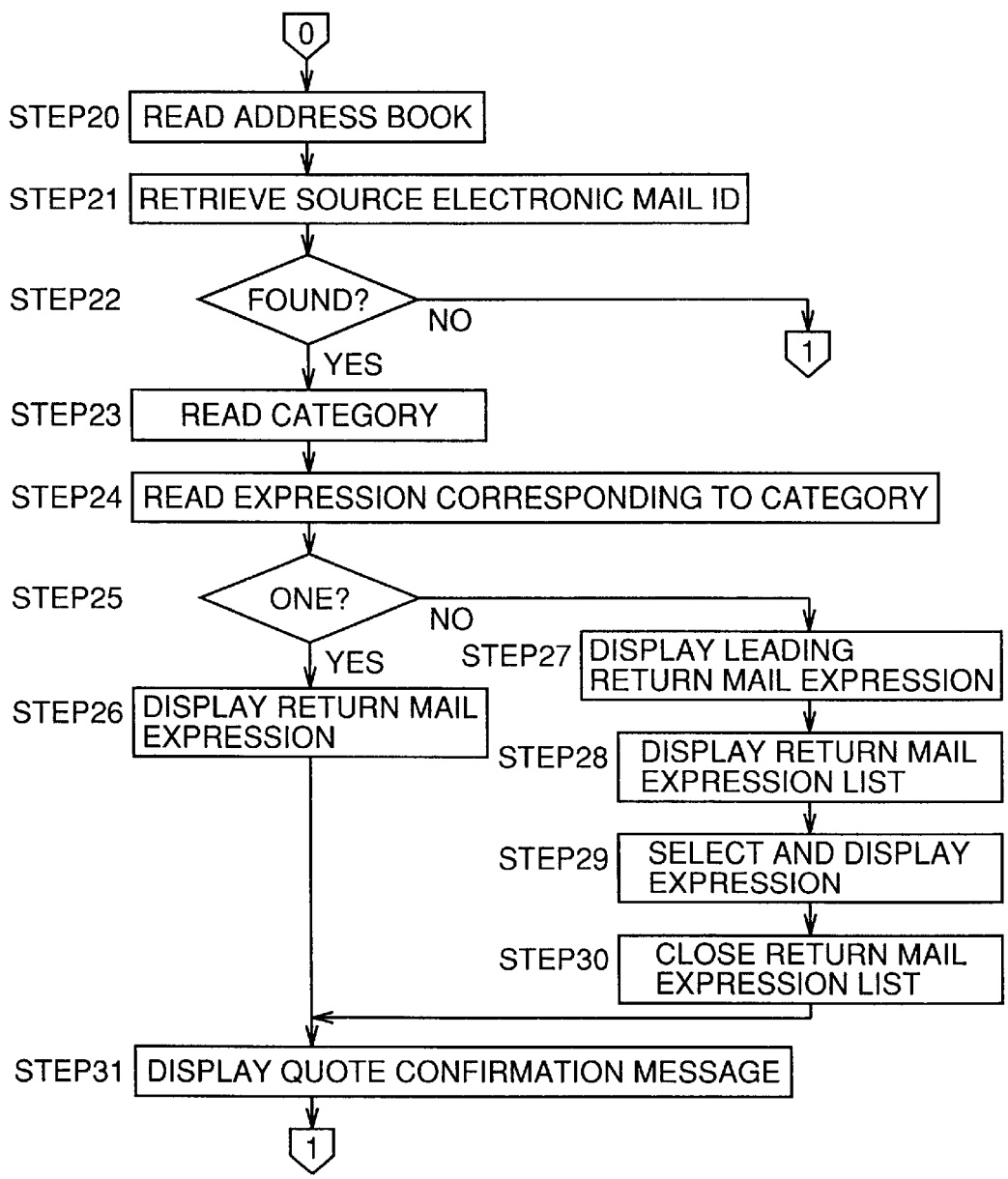

Referring to FIG. 7, central control unit 8 displays a menu screen as shown in FIG. 8 on liquid crystal display unit 2a (STEP 1). Central control unit 8 waits until input/output unit 2 is touched by a pen (STEP 2). When input/output unit 2 is touched by the pen (YES in STEP 2), the touched position is read through tablet control unit 4 into central control unit 8 (STEP 3).

If the position touched by the pen corresponds to a return button 20 ("RETURN" in STEP 4), the screen returns to the one before the menu screen is displayed.

If the position touched by the pen corresponds to a transmit button 16 ("TRANSMIT" in STEP 4), a process of transmitting an electronic mail is conducted (STEP 10), and this process is completed.

If the position touched by the pen corresponds to a receive button 17 ("RECEIVE" in STEP 4), a list of received (incoming) electronic mails (not shown) is displayed (STEP 5), and central control unit 8 waits until any instruction concerning the received electronic mail is issued by the user (STEP 6). When an instruction is issued by the user regarding the received electronic mail (YES in STEP 6) an incoming electronic mail process is conducted (STEP 7), and this process is completed. Concerning the incoming electronic mail process of STEP 7, description will be given below in conjunction with FIGS. 9A to 17.

If the position touched by the pen corresponds to a return mail expression register button 18 ("REGISTER RETURN MAIL EXPRESSION" in STEP 4), a process of registering a return mail expression is conducted (STEP 8) and this process is completed. Concerning the process of registering a return mail expression, description will be given below in conjunction with FIGS. 18 to 23.

If the position touched by the pen corresponds to an other setting button 19 ("OTHER SETTING" in STEP 4), a process of setting various things is conducted (STEP 9), and this process is completed.

Referring to FIGS. 9A to 17, the incoming electronic mail process is described.

Figure 10:
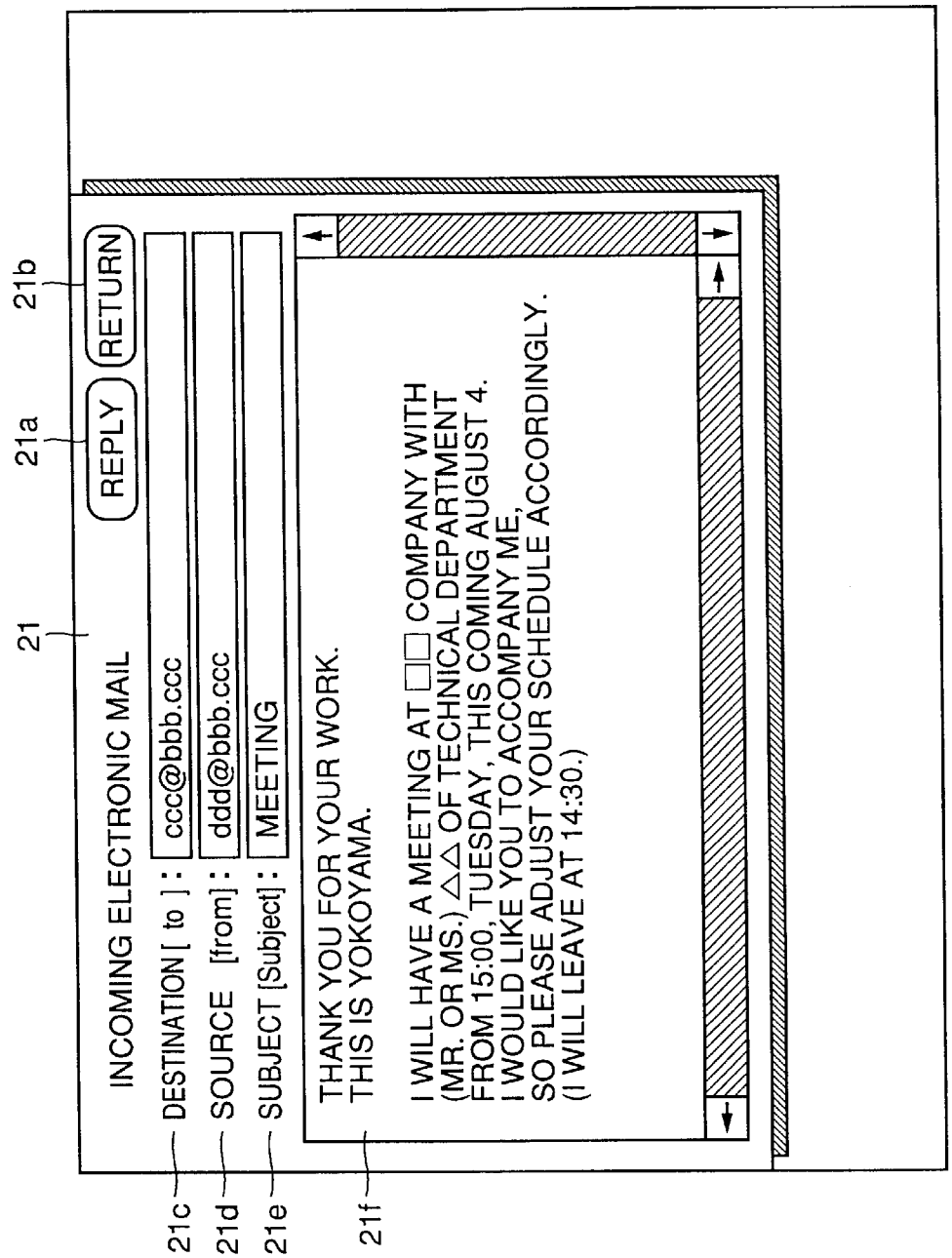
FIGS. 10 to 15 each illustrate one example of a display screen in the incoming mail process.

The user selects an incoming electronic mail from the list of incoming electronic mails, the selected incoming electronic mail is read from incoming electronic mail storing unit 11c, and an incoming electronic mail screen 21 as shown in FIG. 10 is opened (STEP 11).

Central control unit 8 waits until input/output unit 2 is touched by a pen (STEP 12). When input/output unit 2 is touched (YES in STEP 12), the position touched by the pen is read into central control unit 8 through tablet control unit 4 (STEP 13). Determination is then made where the touched position is (STEP 14).

If the position touched by the pen corresponds to a return button 21b ("RETURN" in STEP 14), the screen returns to the one before incoming electronic mail screen 21 is displayed.

Figure 11:
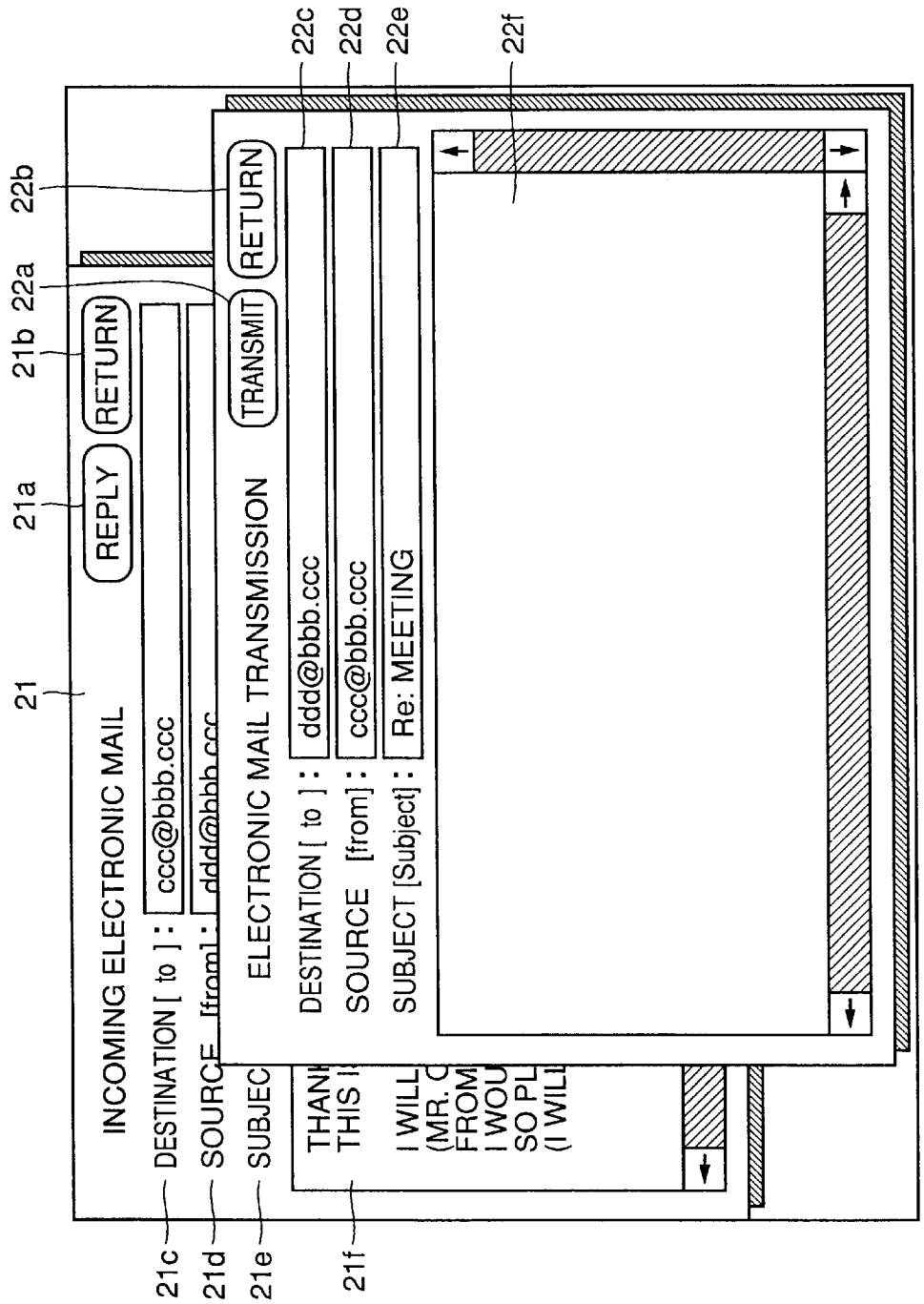

If the position touched by the pen corresponds to a reply button 21a ("REPLY" in STEP 14), an electronic mail ID "ddd@bbb.ccc" of the source of the incoming electronic mail is stored in destination address 11d3 of outgoing electronic mail storing unit 11d (STEP 15). Further, an electronic mail ID "ccc@bbb.ccc" of the destination of the incoming electronic mail is stored in source address 11d2. At the top of the subject of the incoming electronic mail "MEETING," a reply code "Re:" which represents that the mail is a reply electronic mail is added (STEP 17). The subject "Re: MEETING" having the added reply code is stored in outgoing electronic mail subject 11d1 (STEP 18). Based on the contents stored in outgoing electronic mail storing unit 11d in STEP 15 to STEP 18, an electronic mail transmission screen as shown in FIG. 11 is displayed (STEP 19).

Contents of address book memory 11e are read (STEP 20), and the electronic mail ID of the source of the incoming electronic mail is retrieved from address book memory 11e (STEP 21). Determination is made as to whether or not the electronic mail ID of the source of the incoming electronic mail is stored in address book memory 11e (STEP 22). If the corresponding electronic mail ID is not stored in address book memory 11e (NO in STEP 22), the process of STEP 32 as described later is carried out. If the corresponding electronic mail ID is stored in address book memory 11e (YES in STEP 22), the category of the electronic mail ID is read (STEP 23).

The number (category number) corresponding to the category read in STEP 23 is read from category memory 11g and a return mail expression (return mail expressions) corresponding to the category number is (are) read from return mail expression memory 11f (STEP 24). Determination is made on whether or not one return mail expression is read (STEP 25).

Figure 12:
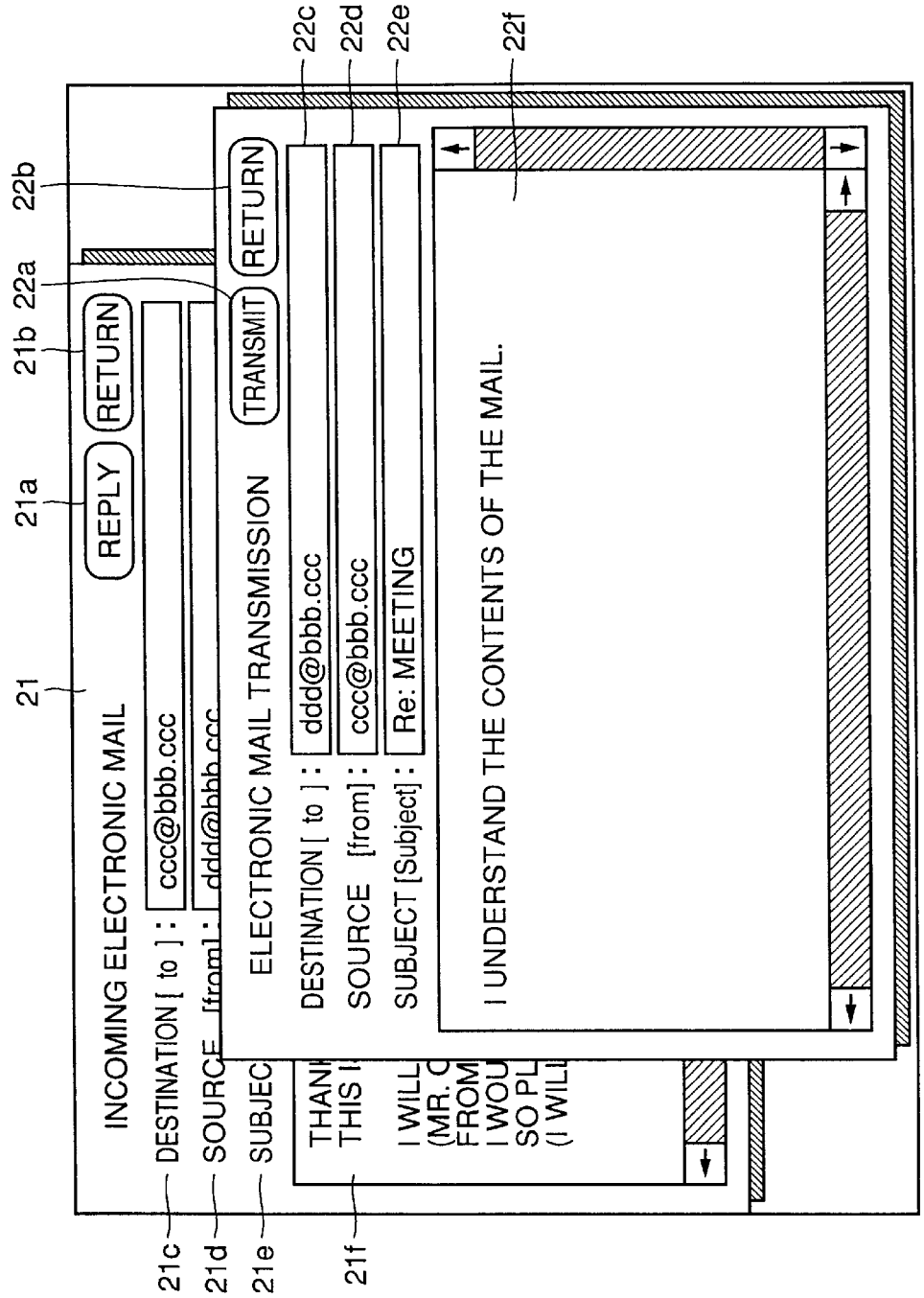

If one mail expression is read (YES in STEP 25), the return mail expression is displayed on content display unit 22f of electronic mail transmission screen 22 (STEP 26) as shown in FIG. 12.

Figure 13:
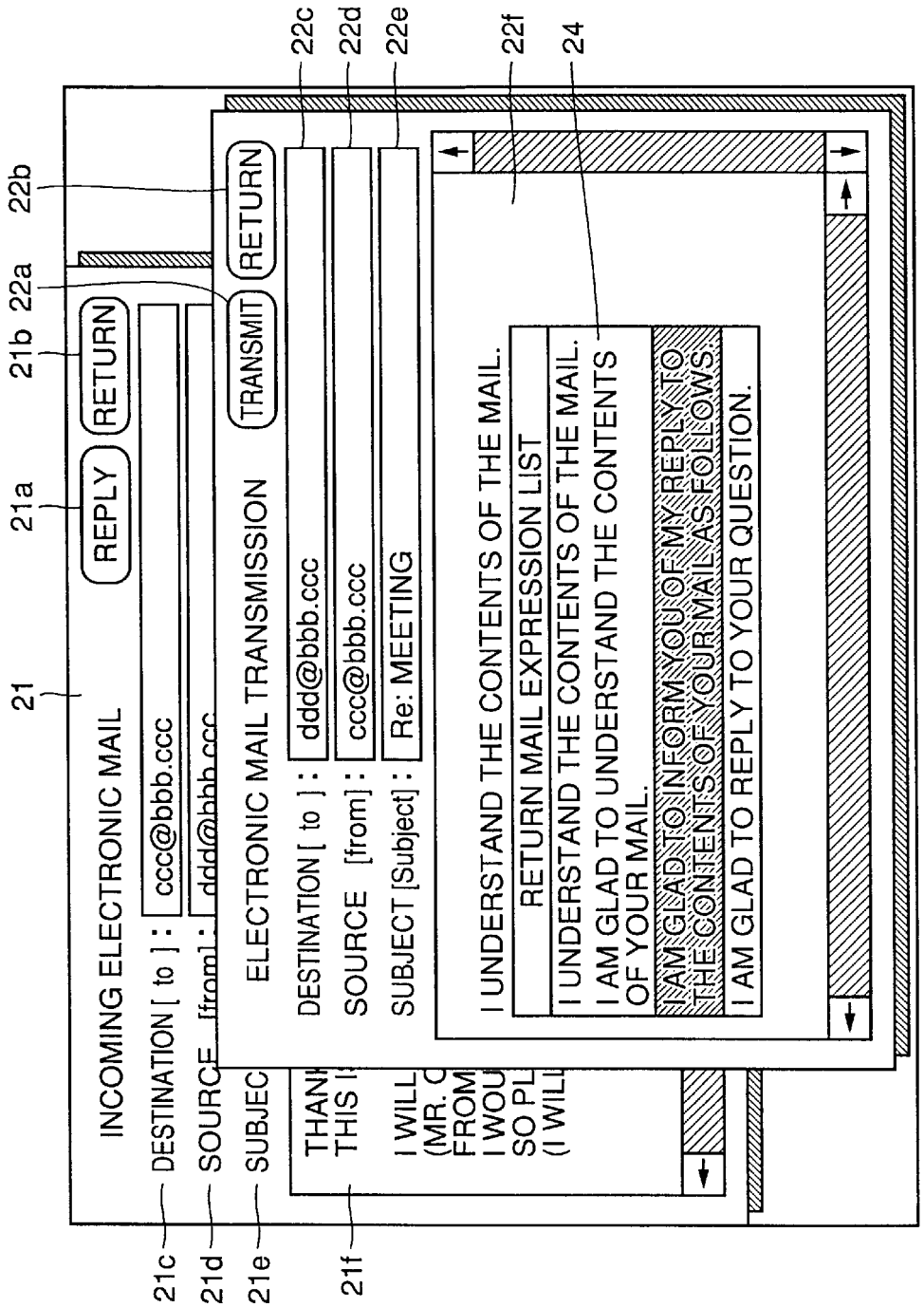

If a plurality of mail expressions are read (NO in STEP 25), a mail expression which is at the top of a plurality of mail expressions is first displayed on content display unit 22f of electronic mail transmission screen 22 (STEP 27) as shown in FIG. 12. Referring to FIG. 13, all the return mail expressions are thereafter displayed near the displayed top mail expression as list of return mail expressions 24 (STEP 28).

Figure 14:
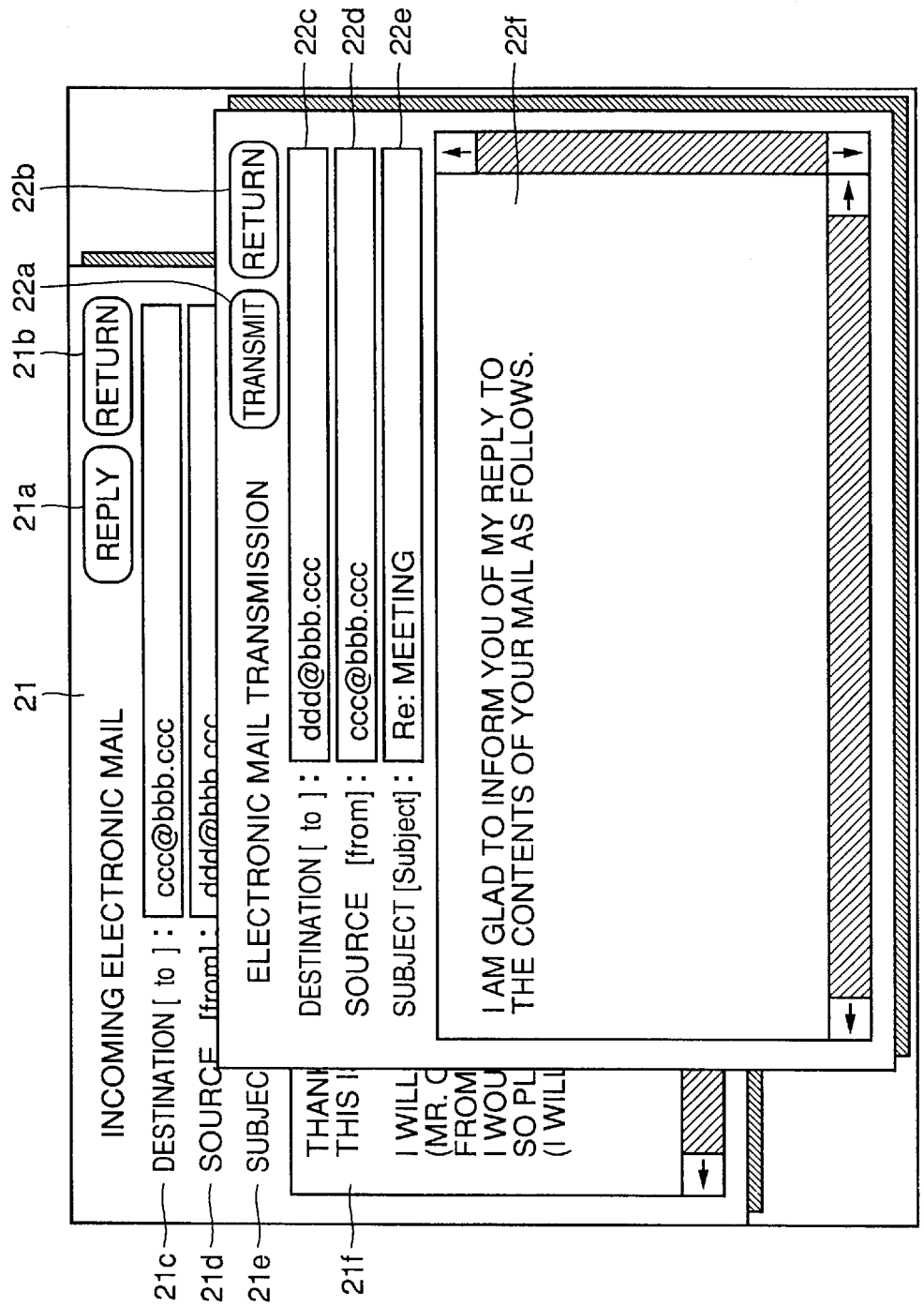

Any mail expression is selected by the user (i.e., sender of the email message) from list of return mail expressions 24, and the selected mail expression is displayed instead of the currently displayed mail expression (STEP 29). Here, a mail expression "I AM GLAD TO INFORM YOU OF MY REPLY TO THE CONTENTS OF YOUR MAIL AS FOLLOWS," is selected. Referring to FIG. 14, list of return mail expressions 24 is closed (STEP 30).

Figure 15:
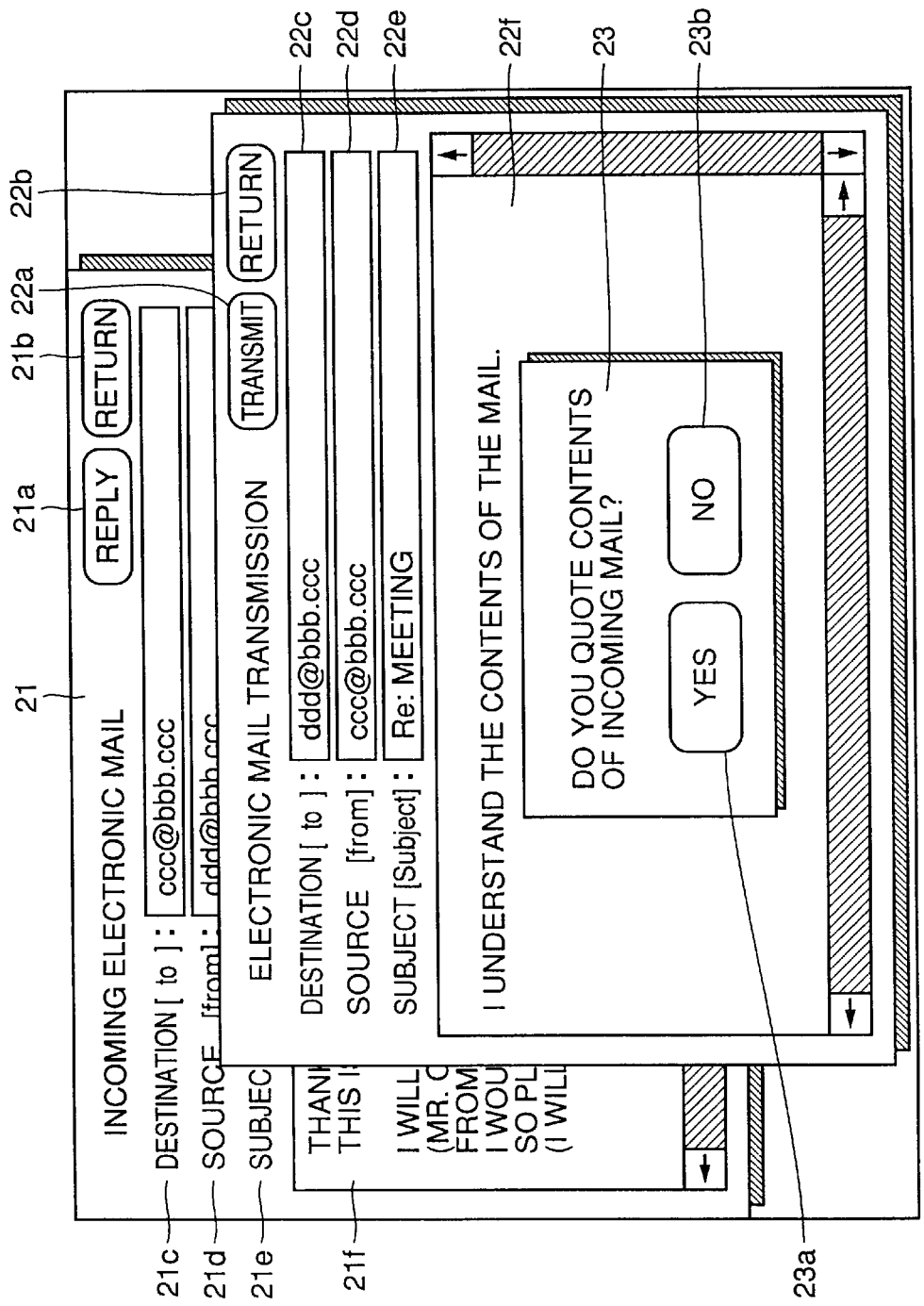
Figure 16:
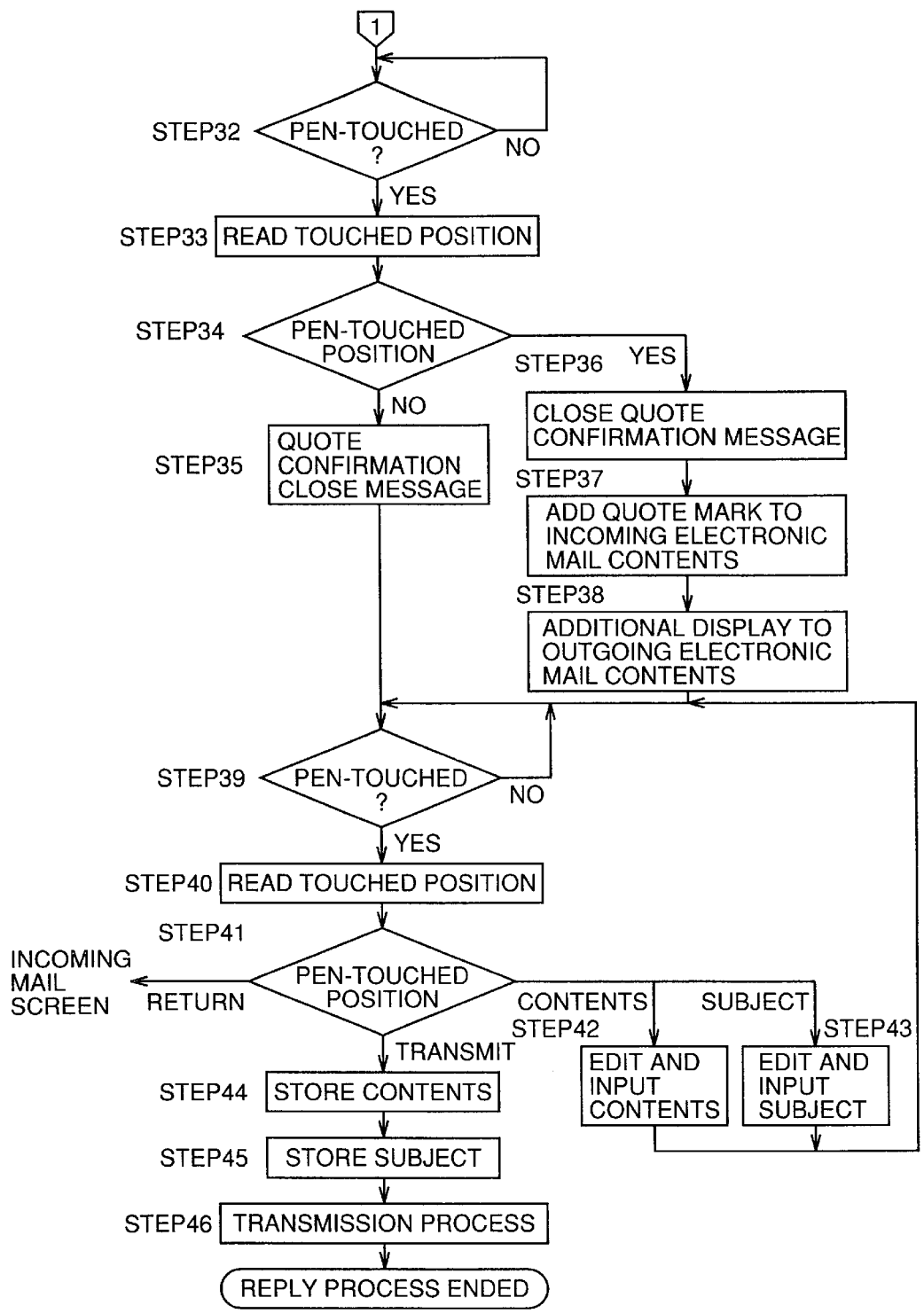
FIG. 16 is a flow chart illustrating a procedure of an incoming mail process.

After the process of STEP 26 or STEP 30, a quote confirmation message 23 as shown in FIG. 15 is displayed on electronic mail transmission screen 22 (STEP 31). Here, mail expression "I UNDERSTAND THE CONTENTS OF THE MAIL" is selected. Referring to FIG. 16, central control unit 8 waits until input/output unit 2 is touched by a pen (STEP 32). When input/output unit 2 is touched by a pen (YES in STEP 32), the touched position is read (STEP 33), and determination is made on where the pen-touched position is (STEP 34).

If the position touched by the pen corresponds to a "NO" button 23b of quote confirmation message 23 ("NO" in STEP 34), quote confirmation message 23 is closed and consequently the display is as shown in FIG. 12.

Figure 17:
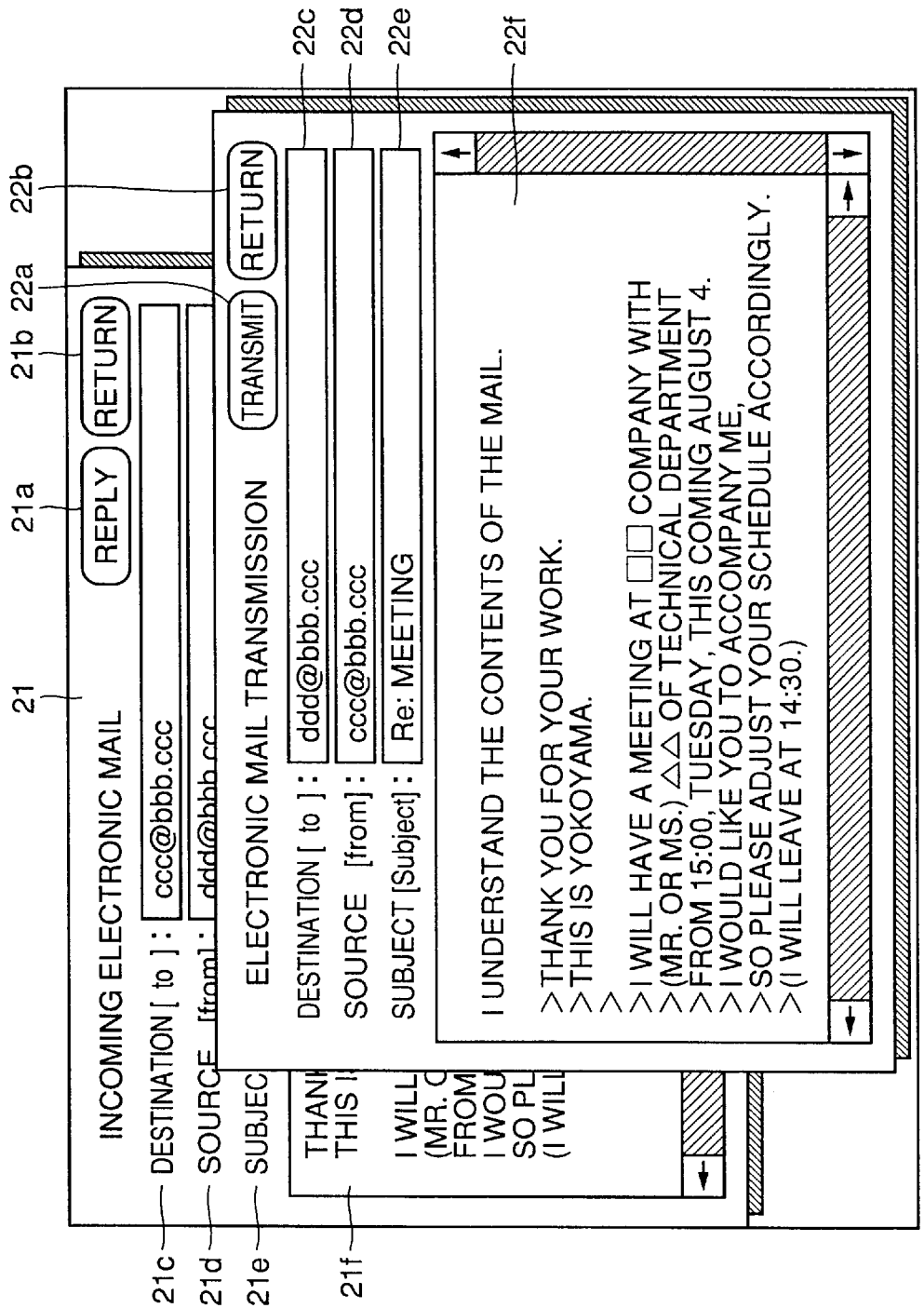
FIG. 17 illustrates an example of a display screen in the incoming mail process.
Figure 18:
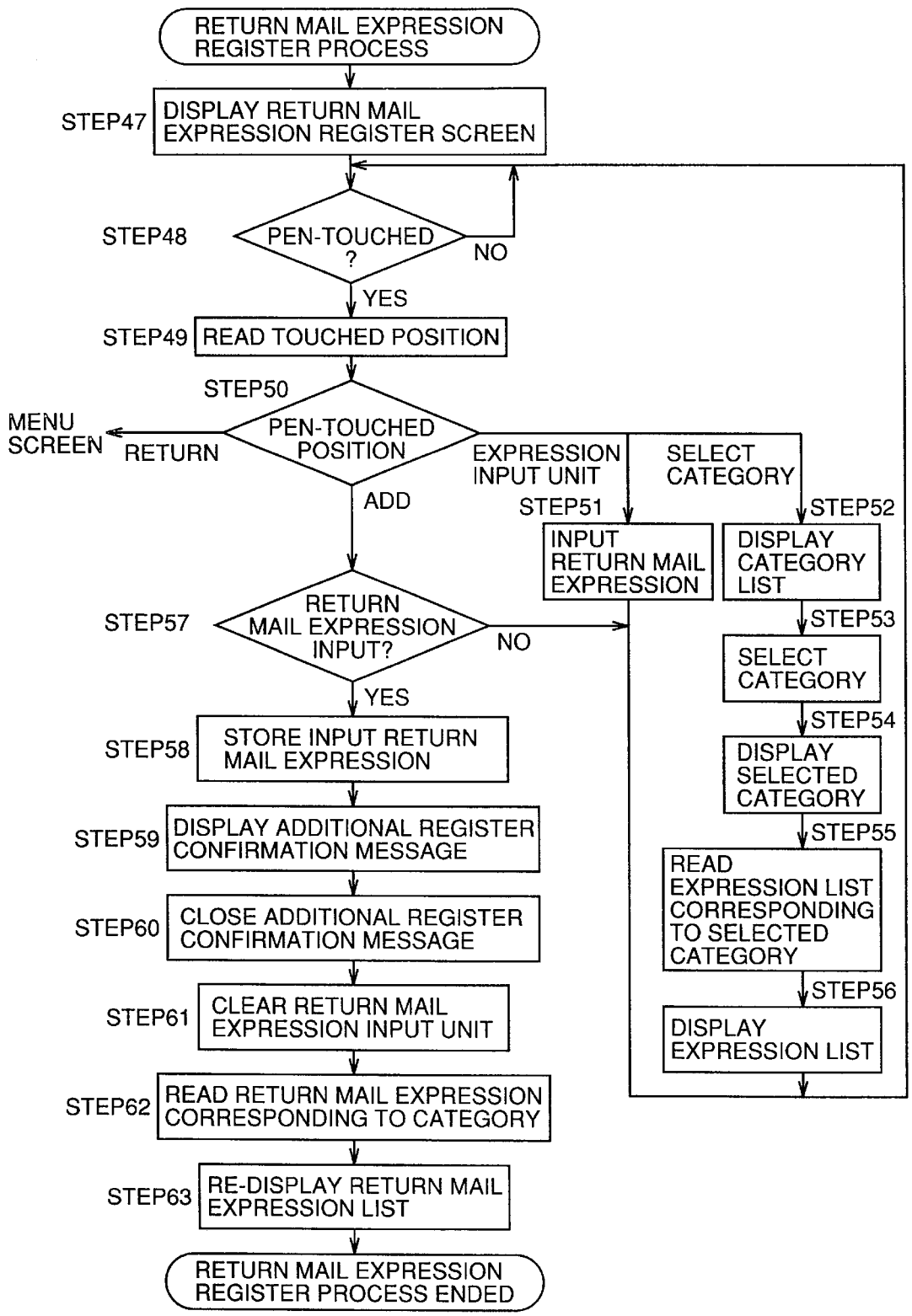
FIG. 18 is a flow chart illustrating a procedure of a return mail expression register process.

If the position touched by the pen corresponds to an "YES" button 23a of quote confirmation message 23 ("YES" in STEP 34), quote confirmation message 23 is closed (STEP 36). Referring to FIG. 17, a quotation mark ">" is added to the top of each line in all the contents of the incoming electronic mail (STEP 37), the contents of the electronic mail having the quotation marks added thereto are additionally displayed next to the return mail expression of content display unit 22f of the transmission screen 22 (STEP 38).

After the process of STEP 35 or STEP 38, central control unit 8 waits until input/output unit 2 is touched by a pen (STEP 39). When input/output unit 2 is touched by a pen (YES in STEP 39), the position touched by the pen is read (STEP 40), and determination is made as to where the pen-touched position is (STEP 41).

If the position touched by the pen corresponds to return button 22b ("RETURN" in STEP 41), electronic mail transmission screen 22 is closed and the screen returns to the state when incoming electronic mail screen 21 is opened.

If the position touched by the pen corresponds to content display unit 22f of transmission screen 22 ("CONTENTS" in STEP 41), input of the contents and edit work are carried out (STEP 42) and the process of STEP 39 is conducted again.

If the position touched by the pen corresponds to subject display unit 22e of transmission screen 22 ("SUBJECT" in STEP 42), input of a subject and edit work are carried out (STEP 43), and the process of STEP 39 is conducted again.

If the position touched by the pen corresponds to transmit button 22a ("TRANSMIT" in STEP 41), data of contents displayed on content display unit 22f is stored in outgoing electronic mail content 11d5, and data displayed on subject display unit 22e is stored in outgoing electronic mail subject 11d1 (STEP 44 and STEP 45). Based on contents of outgoing electronic mail storing unit 11d having various data stored therein, an electronic mail transmission process is performed (STEP 46), and these successive processes are completed.

Referring now to FIGS. 18 to 23, the process of registering a return mail expression (STEP 8 in FIG. 7) is now described in detail.

Figure 19:
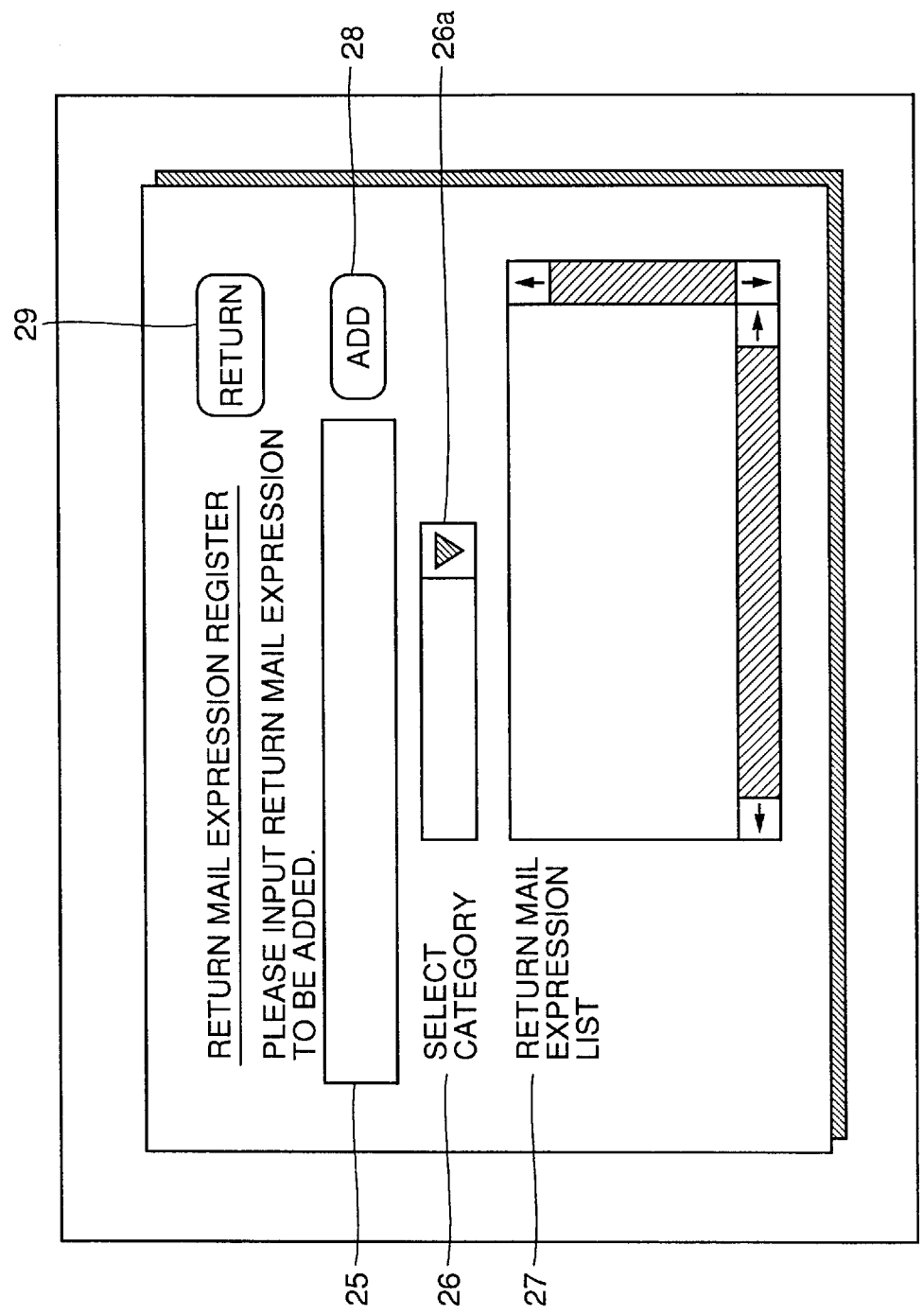
FIGS. 19 to 23 each illustrate an example of a display screen in the return mail expression register process.

Referring to the electronic mail menu screen shown in FIG. 8, when return mail expression register button 18 is touched ("REGISTER RETURN MAIL EXPRESSION" in STEP 4 of FIG. 7), the return mail expression register screen as shown in FIG. 19 is displayed (STEP 47). Central control unit 8 waits until input/output unit 2 is touched by a pen (STEP 48). When input/output unit 2 is touched by a pen (YES in STEP 48), the touched position is read (STEP 49) and determination is made as to where the touched position is (STEP 50).

If the position touched by the pen corresponds to a "RETURN" button 29 ("RETURN" in STEP 50), the menu screen of FIG. 8 is displayed and then the process in STEP 2 is carried out.

If the position touched by the pen corresponds to a return mail expression input unit 25 ("EXPRESSION INPUT UNIT" in STEP 50), input of an expression by the user is accepted (STEP 51). For example, a return mail expression "I AM GLAD TO MAKE A PROPOSAL CONCERNING THE CONTENTS OF YOUR MAIL" is input by the user.

Figure 20:
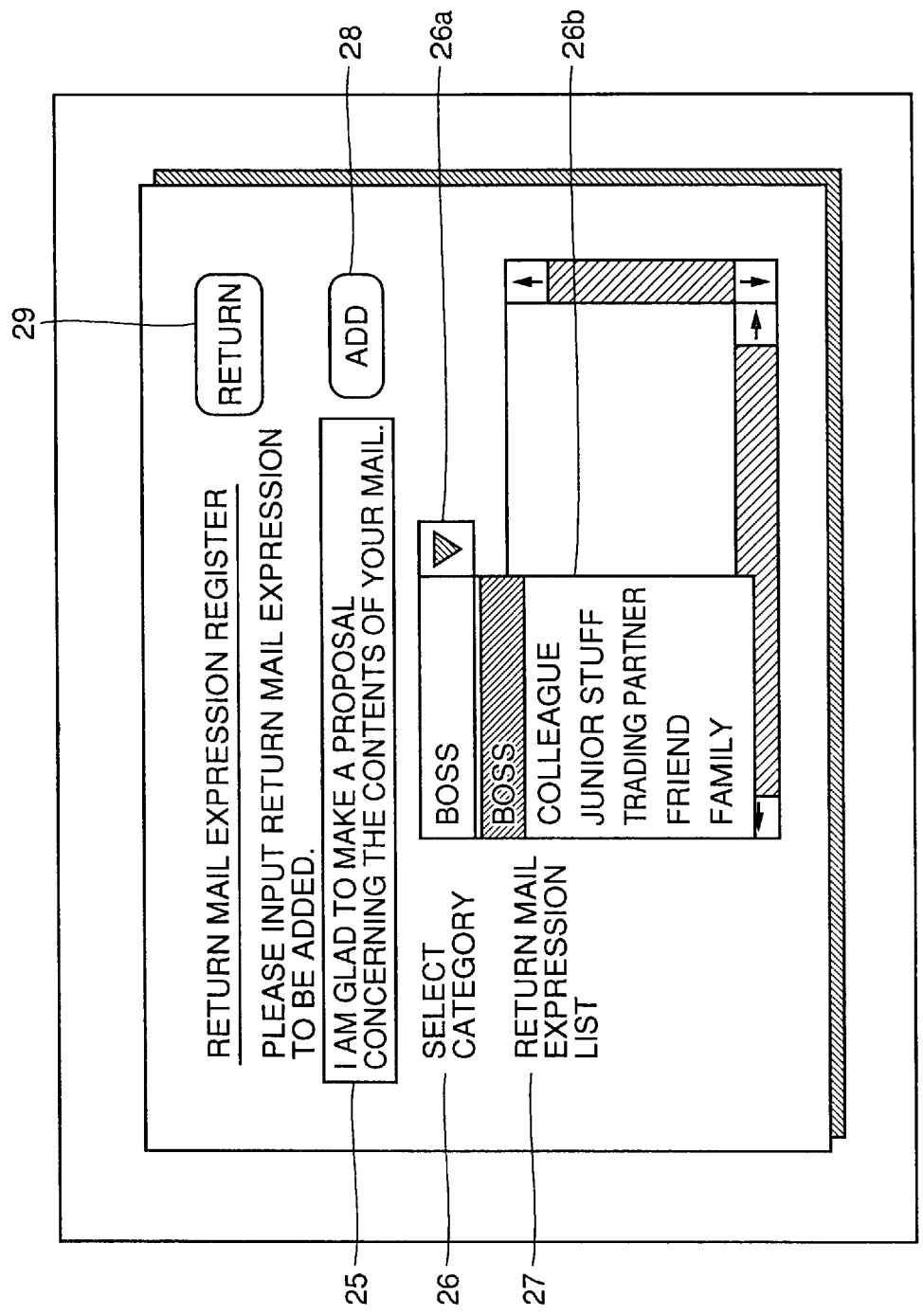
Figure 21:
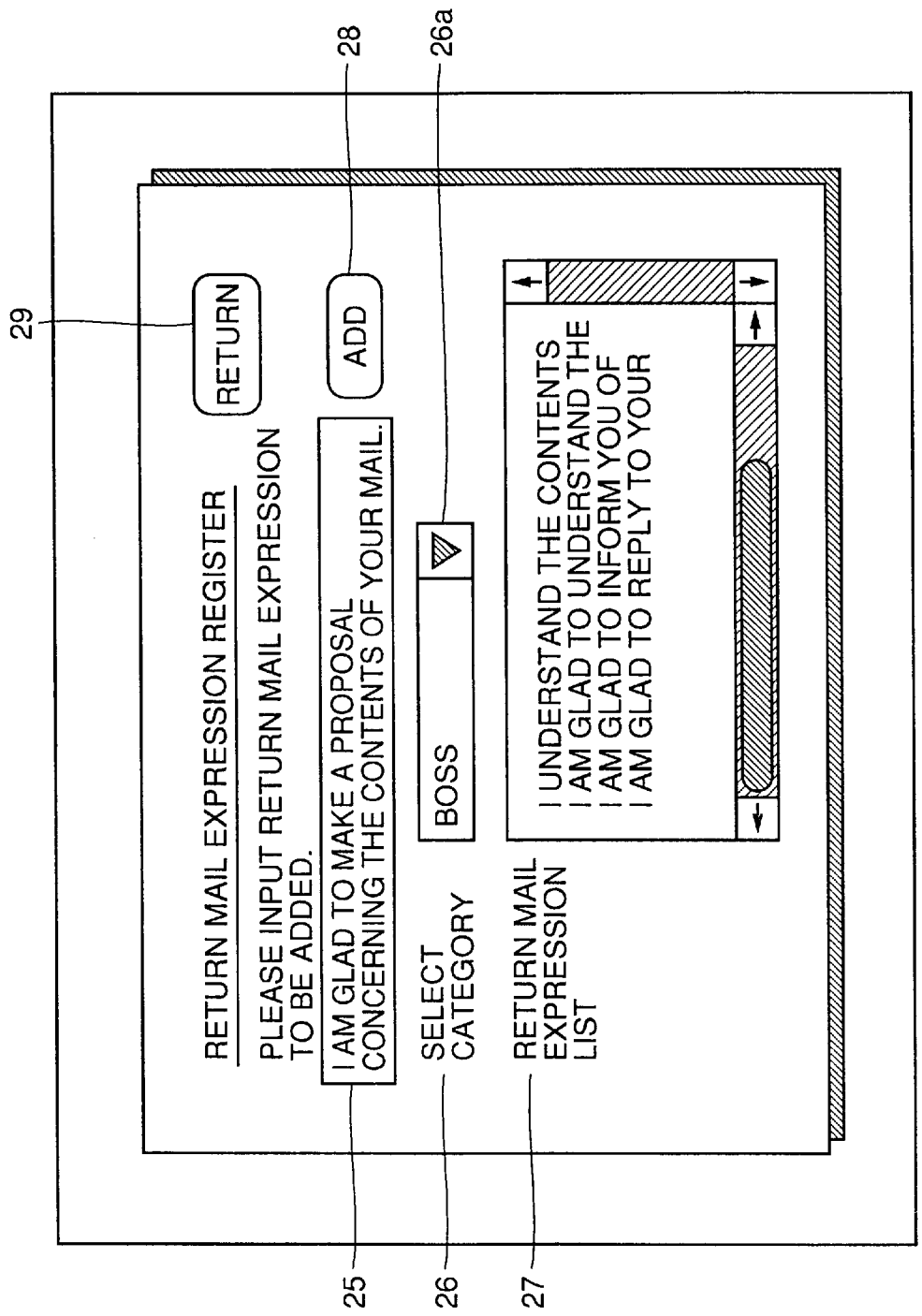

If the position touched by the pen corresponds to an arrow button 26a of a category select unit 26, a category list 26b as shown in FIG. 20 is displayed (STEP 52), and a desired category is selected from the displayed list (STEP 53). The selected category is displayed on category select unit 26 (STEP 54), and a return mail expression corresponding to the category is read from return mail expression memory 11f (STEP 55). Referring to FIG. 21, the read mail expression is displayed on a return mail expression list display unit 27 (STEP 56), and STEP 48 is again carried out.

If the position touched by the pen corresponds to an "ADD" button 28 ("ADD" in STEP 50), determination is made on whether or not a return mail expression is input to return mail expression input unit 25 (STEP 57). If no return mail expression is input (NO in STEP 57), the process of STEP 48 is performed again.

Figure 22:
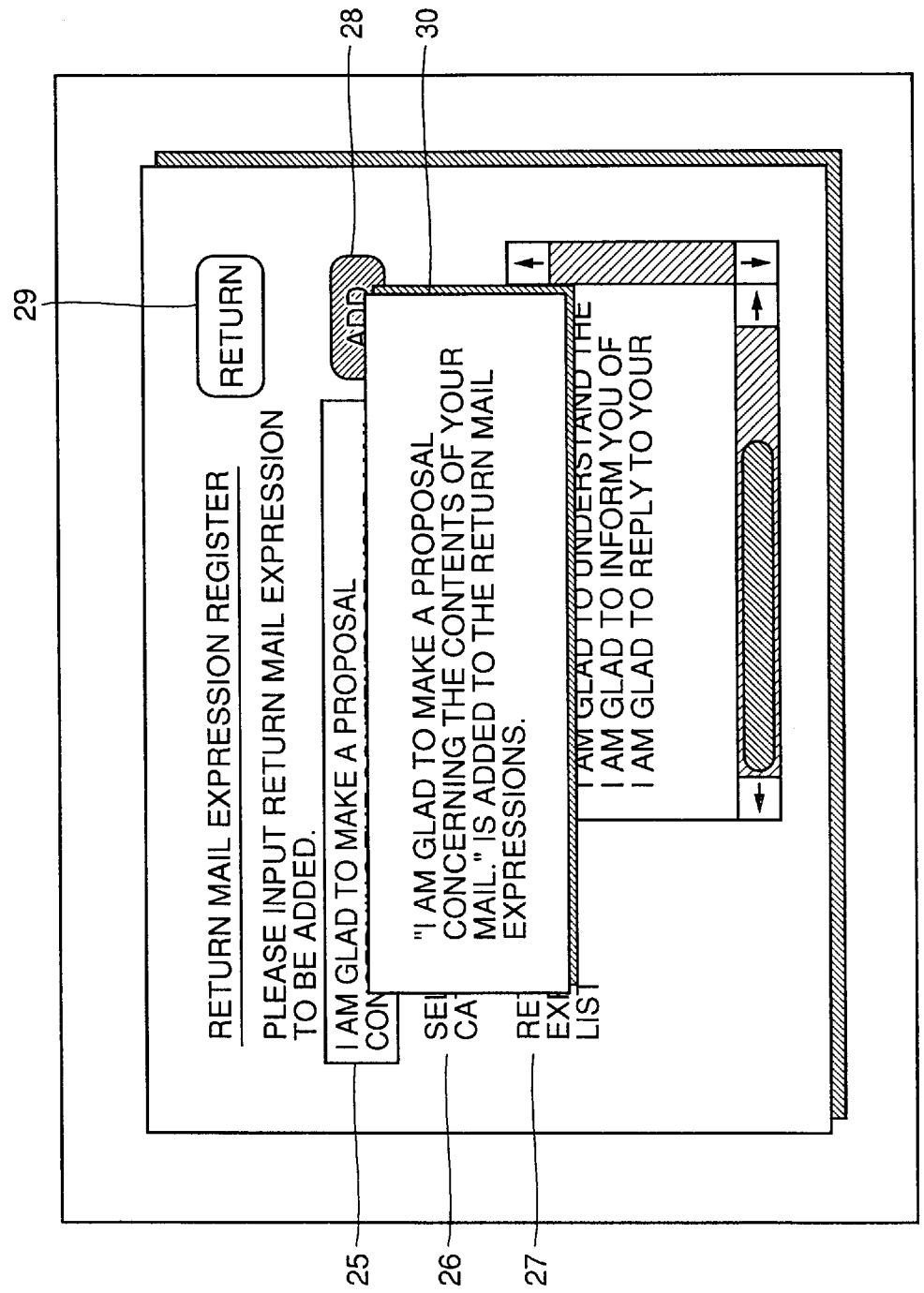

If a return mail expression is input (YES in STEP 57), the input return mail expression is stored in return mail expression memory 1 if together with the number corresponding to the category which is displayed on category select unit 26 (STEP 58). Referring to FIG. 22, a message 30 of ""I AM GLAD TO MAKE A PROPOSAL CONCERNING THE CONTENTS OF YOUR MAIL." IS ADDED TO THE RETURN MAIL EXPRESSIONS." is displayed on the return mail expression register screen, indicating that additional expression is surely registered (STEP 59). After a predetermined time has passed, message 30 is closed (STEP 60) and the display of return mail expression input unit 25 is cleared (STEP 61).

Figure 23:
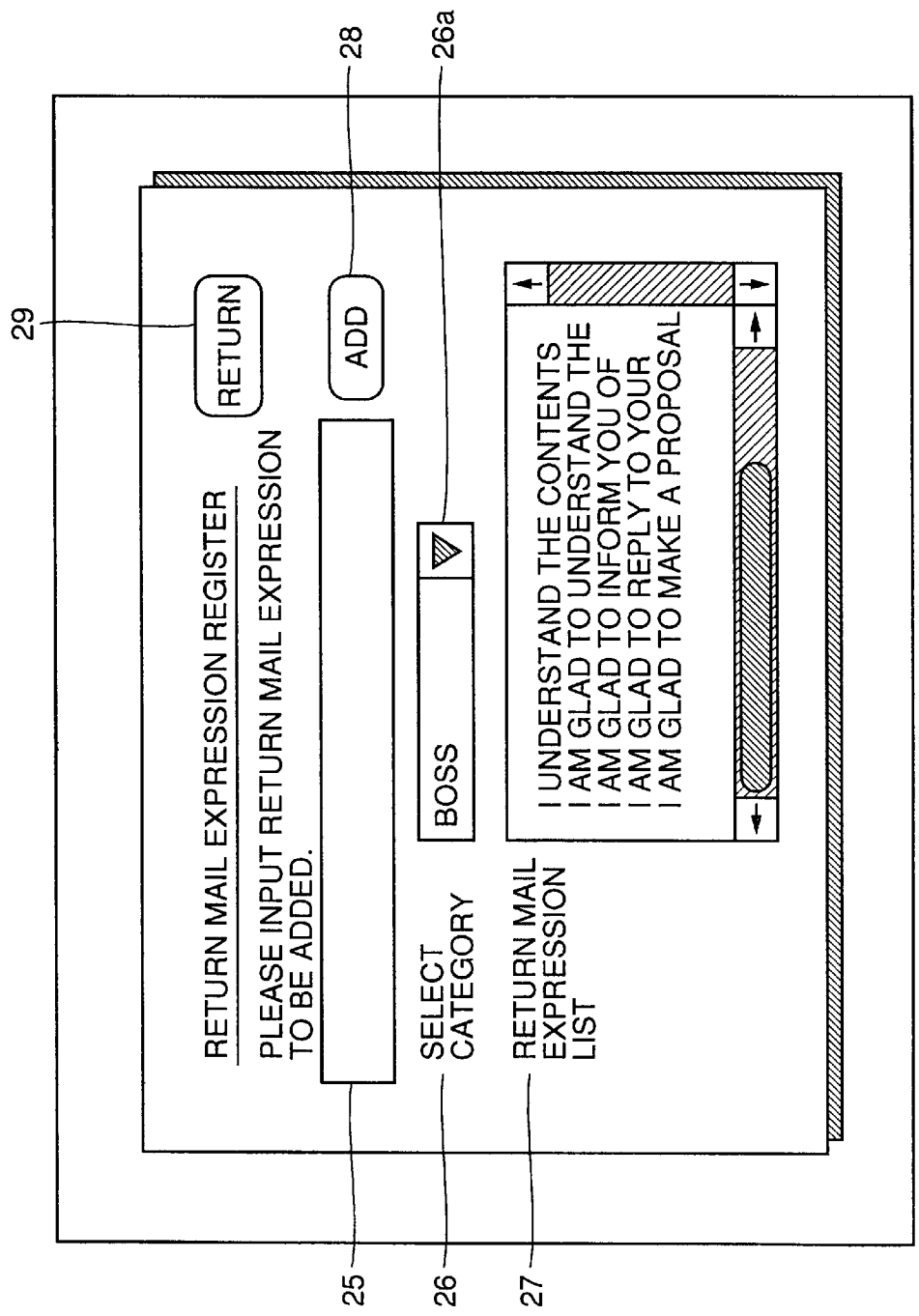

Referring to FIG. 23, return mail expressions corresponding to the currently selected category are read again from return mail expression memory 11f (STEP 62) and displayed on return mail expression list display unit 27 (STEP 63). The return mail expressions include the mail expression added through the above-described processes.

An electronic mail ID and a category of a source (sender) of an electronic mail as well as expressions of a return electronic mail corresponding to the category are thus stored in advance, and an expression appropriate for the destination (receiver) of the return electronic mail is automatically inserted as contents of the return electronic mail when the return electronic mail is composed. Accordingly, the user can automatically compose return sentences which are appropriate for a receiver without input by using the keyboard, pen or the like.

Expressions (words and phrases) for preparing a reply electronic mail have already been registered. The user thus need not work out reply sentences based on the relation between the user (writer) and the receiver each time the user composes the reply mail. Accordingly, the user can easily and speedily compose a return electronic mail formed of sentences appropriate for the receiver by using expressions (words and phrases) suitable for the receiver.

Further, even if a device such as portable information terminal having a small display area is employed, extra input operations are not required so that an environment for composing a return electronic mail is established with superior usability.

It is noted that the description is herein given only to the case in which a return mail expression is automatically inserted into a return electronic mail in this embodiment, however, even if an electronic mail is to be composed which is not limited to the return electronic mail, the embodiment is naturally applicable to the case in which a salutation sentence suitable for a receiver is inserted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of composing an electronic mail which is employed in an electronic mail composing device including:
    a memory which stores an electronic mail ID of a destination, a category attribute of said electronic mail ID, mail expressions grouped according to said category attribute, and an incoming electronic mail;
    an input/output unit which receives an operational instruction from a user; and
    a central control unit which composes an outgoing electronic mail following the operational instruction of said input/output unit, the method of composing an electronic mail comprising the steps of:
        setting by said central control unit an electronic mail ID of a destination in said outgoing electronic mail following the operational instruction of said input/output unit; and
        inserting by said central control unit a mail expression corresponding to a category attribute of the electronic mail ID of said destination stored in said memory into a body of said outgoing electronic mail following the operational instruction of said input/output unit.

2. The method of composing an electronic mail according to claim 1, wherein
    said step of setting the electronic mail ID of said destination includes the step of setting by said central control unit an electronic mail ID of a source of said incoming electronic mail stored in said memory in said outgoing electronic mail as the electronic mail ID of said destination following the operational instruction of said input/output unit, and
    said step of inserting said mail expression into the body of said outgoing electronic mail includes the step of determining by said central control unit whether or not the electronic mail ID of said destination is registered in said memory to insert said mail expression corresponding to the category attribute of the electronic mail ID of said destination into the body of said outgoing electronic mail if said electronic mail ID of the destination is registered in said memory.

3. The method of composing an electric electronic mail according to claim 2, further comprising the steps of:
    allowing a sender by said central control unit to select whether or not contents of said incoming electronic mail are quoted; and
    quoting by said central control unit contents of said incoming electronic mail stored in said memory in contents of said outgoing electronic mail if said central control unit receives an operational instruction from said input/output unit to quote contents of said incoming electronic mail.

4. The method of composing an electric electronic mail according to claim 3, further comprising the steps of:
    allowing a sender by said central control unit to select said category attribute of said electronic mail ID;
    allowing the sender by central control unit to compose a mail expression according to said selected category attribute; and
    storing by said central control unit said mail expression composed by the sender in said memory together with said category attribute.

5. The method of composing an electronic mail according to claim 2, further comprising the steps of:
    allowing a sender by said central control unit to select said category attribute of said electronic mail ID;
    allowing the sender by said control unit to compose a mail expression according to said selected category attribute; and
    storing by said central unit said mail expression composed by the sender in said memory together with said category attribute.

6. The method of composing an electronic mail according to claim 1, wherein
    said step of inserting said mail expression into the body of said outgoing electronic mail includes the steps of:
        determining by said central control unit whether there is one type of mail expression or are a plurality of types of mail expressions corresponding to said category attribute stored in said memory; and
        inserting by central control unit said mail expressions corresponding into the body of said outgoing electronic mail if there is one type of mail expression corresponding to said category attribute, and if there are a plurality of types of mail expressions corresponding to said category attribute, allowing the sender by said central control unit to select one of said plurality of types of mail expressions to insert by said central control unit said mail expression selected by the sender via input/output unit which is stored in said memory into the body of said outgoing electronic mail.

7. The method of composing an electronic mail according to claim 6, further comprising the steps of:
    allowing a sender by said central control unit to select said category attribute of said electronic mail ID;
    allowing the sender by said central control unit to compose a mail expression according to said selected category attribute; and
    storing by said central control unit said mail expression composed by the sender in said memory together with said category attribute.

8. The method of composing an electronic mail according to claim 1, further comprising the steps of:
    allowing a sender by said central control unit to select said category attribute of said electronic mail ID;
    allowing the sender by said central control unit to compose a mail expression according to said selected category attribute; and
    storing by said central control unit said mail expression composed by the sender in said memory together with said category attribute.

9. A computer-readable recording medium on which is recorded an electronic mail composing program in order to have a computer execute a method of composing an electronic mail,
    said computer including a memory which stores an electronic mail ID of a destination, a category attribute of said electronic mail ID, mail expressions grouped according to said category attribute, and an incoming electronic mail, and said method of composing an electronic mail including the steps of; setting an electronic mail ID of a destination in an outgoing electronic mail; and inserting a mail expression corresponding to the category attribute of the electronic mail ID of said destination which is stored in said memory into a body of said outgoing electronic mail.

10. The computer-readable recording medium acccording to claim 9, wherein said step of setting the electronic mail ID of said destination includes the step of setting an electronic mail ID of a source of said incoming electronic mail stored in said memory in said outgoing electronic mail as the electronic mail ID of said destination, and said step of inserting said mail expression into the body of said outgoing outgoing electronic mail includes the steps of determining whether or not the electronic mail ID of said destination is registered in said memory to insert, if the electronic mail ID of said destination is registered in said memory, said mail expression corresponding to the category attribute of the electronic mail ID of said destination into the body of said outgoing electronic mail.

11. The computer-readable recording according to claim 10, wherein said method of composing an electronic mail further includes the steps of:

allowing a sender to select whether or not contents of said incoming electronic mail are quoted; and quoting the contents of said incoming electronic mail stored in said memory in contents of said outgoing electronic mail if an operational instruction to quote contents of said incoming electronic mail is issued.

12. The computer-readable medium according to claim 11, wherein said method of composing an electronic mail further includes the steps of:

allowing a sender to select said category attribute of said electronic mail ID;

allowing the sender to compose a mail expression according to said selected category attribute; and storing said mail expression composed by the sender in said memory together with said category attribute.

13. The computer-readable recording medium according to claim 10, wherein said method of composing an electronic mail further includes the steps of:

allowing a sender to select said category attribute of said electronic mail ID;

allowing the sender to compose a mail expression according to said selected category attribute; and storing said mail expression composed by the sender in said memory together with said category attribute.

14. The computer-readable recording medium according to claim 9, wherein said step of inserting said mail expression into the body of said outgoing electronic mail includes the steps of:

determining whether there is one type of mail expression or a plurality of types of mail expressions corresponding to said category attribute stored in said memory; and inserting, if there is one type of mail expression corresponding to said category attribute, said mail expression into the body of said outgoing electronic mail, and allowing, if there are a plurality of types of mail expressions corresponding to said category attribute, a sender to select one of said plurality of types of mail expressions to insert the selected mail expression stored in said memory into the body of said outgoing electronic mail.

15. The computer-readable recording medium according to claim 14, wherein said method of composing an electronic mail further includes the steps of:

allowing a sender to select said category attribute of said electronic mail ID;

allowing the sender to compose a mail expression according to said selected category attribute; and storing said mail expression composed by the user in said memory together with said category attribute.

16. The computer-readable recording medium according to claim 9, wherein said method of composing an electronic mail further includes the steps of:

allowing a sender to select said category attribute of said electronic mail ID;

allowing the sender to compose a mail expression according to said selected category attribute; and storing said mail expression composed by the sender in said memory together with said category attribute.

\* \* \* \* \*